(12) United States Patent
Yamamoto et al.

(10) Patent No.: US 10,269,180 B2
(45) Date of Patent: Apr. 23, 2019

(54) INFORMATION PROCESSING APPARATUS AND INFORMATION PROCESSING METHOD, DISPLAY APPARATUS AND DISPLAY METHOD, AND INFORMATION PROCESSING SYSTEM

(71) Applicant: SONY CORPORATION, Tokyo (JP)

(72) Inventors: Kazuyuki Yamamoto, Kanagawa (JP); Yasuhide Hosoda, Kanagawa (JP); Manabu Kii, Tokyo (JP)

(73) Assignee: SONY CORPORATION, Tokyo (JP)

( * ) Notice: Subject to any disclaimer, the term of this patent is extended or adjusted under 35 U.S.C. 154(b) by 220 days.

(21) Appl. No.: 14/782,638

(22) PCT Filed: Mar. 4, 2014

(86) PCT No.: PCT/JP2014/055352
§ 371 (c)(1),
(2) Date: Oct. 6, 2015

(87) PCT Pub. No.: WO2014/171200
PCT Pub. Date: Oct. 23, 2014

(65) Prior Publication Data
US 2016/0093107 A1    Mar. 31, 2016

(30) Foreign Application Priority Data
Apr. 16, 2013    (JP) .................................. 2013-086023

(51) Int. Cl.
*G06T 19/00* (2011.01)
*A63F 13/92* (2014.01)
(Continued)

(52) U.S. Cl.
CPC .......... *G06T 19/006* (2013.01); *A63F 13/212* (2014.09); *A63F 13/213* (2014.09);
(Continued)

(58) Field of Classification Search
None
See application file for complete search history.

(56) References Cited

U.S. PATENT DOCUMENTS

2012/0263154 A1* 10/2012 Blanchflower ... G06F 17/30247
370/338
2013/0194164 A1* 8/2013 Sugden ................ G02B 27/017
345/8
(Continued)

FOREIGN PATENT DOCUMENTS

JP    2002-112286 A    4/2002
JP    2002-184398 A    6/2002
(Continued)

OTHER PUBLICATIONS

Extended European Search Report for EP Patent Application No. 14785048.1, dated Nov. 2, 2016, 14 pages.
(Continued)

*Primary Examiner* — James A Thompson
(74) *Attorney, Agent, or Firm* — Chip Law Group

(57) ABSTRACT

Interaction between a virtual object and the real space is to be presented in a preferred manner.
In accordance with a user's viewing or finding of an actual object 151, the virtual object 150 corresponding to the actual object 151 appears. The actual object 151 includes output devices that generate outputs such as vibration, electric pulse, heat or cooling air, wind, sound, light, a transfer, and a jump. The actual object 151 performs reaction to action performed on the actual object 151 by the virtual object 150. Where interaction is conducted between the virtual object 150 and the actual object 151 in synchronization, a stronger impression of reality can be given to the user.

17 Claims, 32 Drawing Sheets

(51) Int. Cl.
| | |
|---|---|
| *A63F 13/25* | (2014.01) |
| *A63F 13/26* | (2014.01) |
| *A63F 13/24* | (2014.01) |
| *A63F 13/65* | (2014.01) |
| *A63F 13/212* | (2014.01) |
| *A63F 13/213* | (2014.01) |
| *A63F 13/215* | (2014.01) |
| *A63F 13/285* | (2014.01) |
| *G02B 27/01* | (2006.01) |
| *G06F 3/01* | (2006.01) |
| *H04N 5/225* | (2006.01) |
| *A63F 13/217* | (2014.01) |

(52) U.S. Cl.
CPC ............ *A63F 13/215* (2014.09); *A63F 13/24* (2014.09); *A63F 13/25* (2014.09); *A63F 13/26* (2014.09); *A63F 13/285* (2014.09); *A63F 13/65* (2014.09); *A63F 13/92* (2014.09); *G02B 27/0172* (2013.01); *G06F 3/011* (2013.01); *G06F 3/012* (2013.01); *G06F 3/016* (2013.01); *H04N 5/225* (2013.01); *A63F 13/217* (2014.09); *A63F 2300/5553* (2013.01); *G02B 2027/014* (2013.01)

(56) References Cited

U.S. PATENT DOCUMENTS

| | | | | |
|---|---|---|---|---|
| 2013/0286004 | A1* | 10/2013 | McCulloch | G06T 19/006 345/419 |
| 2014/0125469 | A1* | 5/2014 | Smith | G06F 3/016 340/407.2 |
| 2015/0130790 | A1* | 5/2015 | Vasquez, II | G06T 19/006 345/419 |
| 2015/0375124 | A1* | 12/2015 | Leyland | A63F 13/02 463/31 |

FOREIGN PATENT DOCUMENTS

| | | |
|---|---|---|
| JP | 2002-304246 A | 10/2002 |
| JP | 2005-012385 A | 1/2005 |
| JP | 2005165776 A | 6/2005 |
| JP | 2006-072667 A | 3/2006 |
| JP | 2006262980 A | 10/2006 |
| JP | 2008304268 A | 12/2008 |
| JP | 2009-069918 A | 4/2009 |
| JP | 2010-049690 A | 3/2010 |
| JP | 2011521318 A | 7/2011 |
| JP | 2012248930 A | 12/2012 |
| JP | 2014-010838 A | 1/2014 |
| KR | 20120027837 A | 3/2012 |
| WO | 2011/119118 A1 | 9/2011 |

OTHER PUBLICATIONS

Seo, et al., "One-Handed Interaction with Augmented Virtual Objects on Mobile Devices", Department of Electronics and Computer Engineering Hanyang University, Seoul, Korea, 06 pages.

Kijima, et al, "Reflex HMD to Compensate Lag and Correction of Derivative Deformation", Proceedings of the IEEE Virtual Reality, 2002, pp. 01-08.

Knoerlein, et al., "Visuo-Haptic Collaborative Augmented Reality Ping-Pong", Computer Vision Laboratory ETH Zürich CH-8092 Zürich, Switzerland, 2007, pp. 91-94.

* cited by examiner

HEAD MOUNT DISPLAY 2101

MOVEMENT OF FIELD OF VIEW
(MOVEMENT OF USER'S HEAD)

HEAD MOUNT DISPLAY 2101

HEAD MOUNT DISPLAY 2101

⬇ MOVEMENT OF FIELD OF VIEW
(MOVEMENT OF USER'S HEAD)

HEAD MOUNT DISPLAY 2101

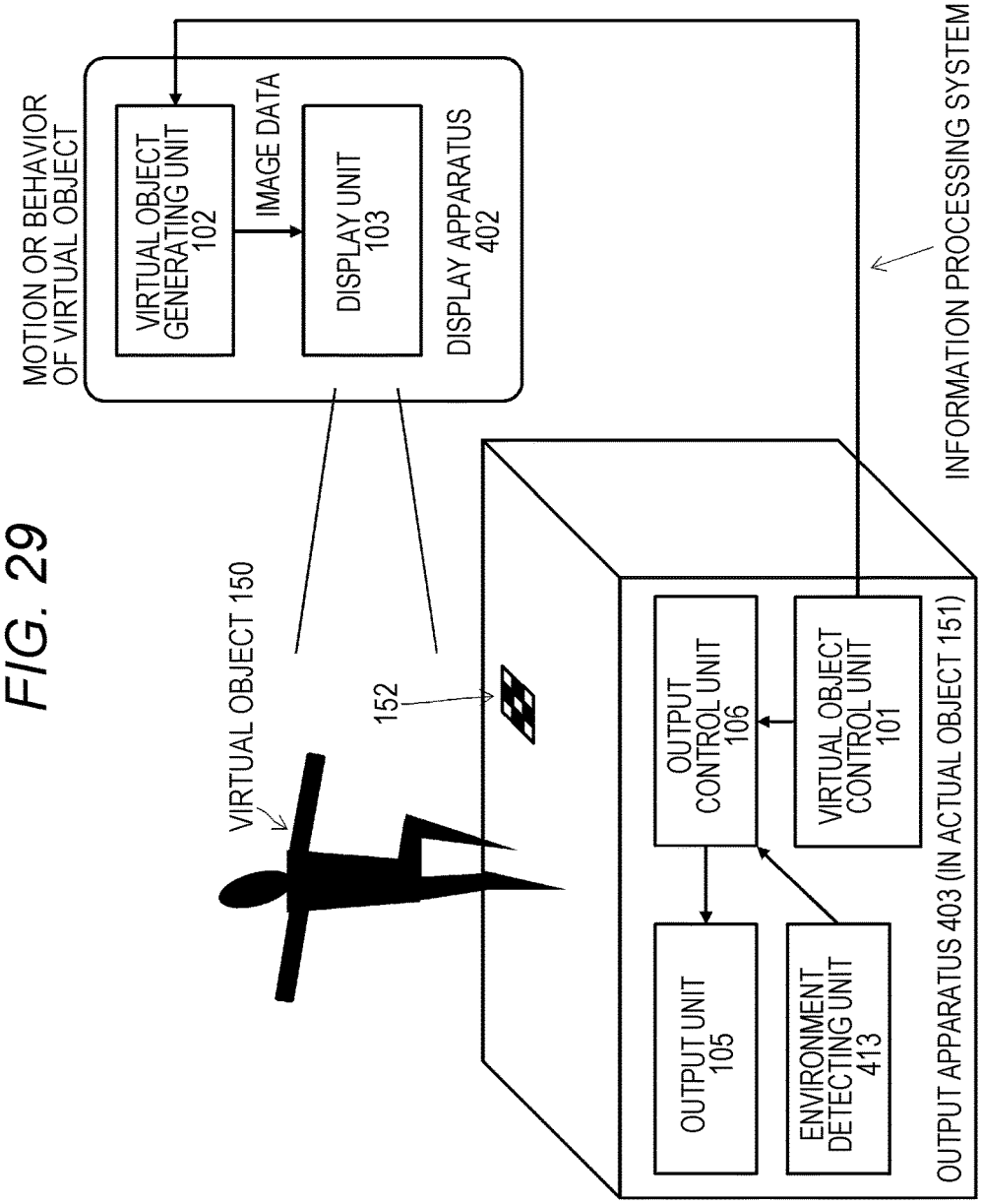

INFORMATION PROCESSING APPARATUS AND INFORMATION PROCESSING METHOD, DISPLAY APPARATUS AND DISPLAY METHOD, AND INFORMATION PROCESSING SYSTEM

TECHNICAL FIELD

The technology disclosed in this specification relates to an information processing apparatus and an information processing method for performing processing related to a virtual image combined with a real image in an augmented reality image, a display apparatus and a display method, and an information processing system. Particularly, the technology relates to an information processing apparatus and an information processing method for presenting interaction between a virtual object and the real space, a display apparatus and a display method, and an information processing system.

BACKGROUND ART

Virtual creatures are now widely used as characters in 2D or 3D games, avatars of players (users), or user interfaces of computers in the fields of description in information processing. Movement of a virtual creature of this kind is generated in an information processing apparatus, so that the virtual creature freely moves on a screen, or emits a sound.

Also, technologies for overlapping a virtual image on a real image, such as augmented reality (AR) and mixed reality, are spreading these days. A virtual image to be overlapped on a real image may be an image of a virtual creature, such as a character in a game, an avatar of a player (user), a virtual pet, or a user interface of a computer, or a virtual mobile object such as an automobile.

For example, there is a suggested entertainment device that displays a virtual pet combined with an image of real environments. The virtual pet can talk with a user and walk around on a virtual screen (see Patent Document 1, for example). In this entertainment device, a virtual pet generated by a system unit is rendered in a real image taken with a video camera, and is displayed on a display/sound output apparatus such as a monitor or a television set equipped with a display and a speaker However, the virtual pet moves only in the screen, and the sound or the like that expresses the action or reaction of the virtual pet is output only from the installation site of the display/sound output apparatus. Therefore, there is a limit to realistic expression of interaction between the virtual pet and the real space.

There also is a suggested object display apparatus. In this object display apparatus, the depth position of a three-dimensional image displayed on a three-dimensional display apparatus of DFD (Depth Fusion Display) type is adjusted to a depth position through which a real object passes, so as to give the impression that a virtual object exists three-dimensionally in the same space as the viewer, and the virtual object and the viewer interact with each other (see Patent Document 2, for example). However, this object display apparatus can provide only visual interaction effects. Also, such interaction effects are valid only in the installation site of the object display apparatus displaying the virtual object.

There also is a suggested image processing method for superimposing a video image of a virtual space including a virtual object on the real space, and presenting the video image through a head mount display (see Patent Document 3, for example). According to this image processing method, a speaker outputs sound effects such as a sound of a virtual object moving around in a virtual space. However, such a sound effect expresses interaction of the virtual object in the virtual space, and does not present interaction of the virtual object with the real space.

There also is a suggested information terminal device that displays an image of a virtual pet so that the virtual pet appears as a virtual image on the human skin in the actual field of view (see Patent Document 4, for example). When the virtual pet moves along with the movement of the skin of a hand or the like, the user can get the impression that the virtual pet is reacting to the movement of the skin. That is, with this information terminal device, a user in the real space can perform action on the virtual pet, but the virtual pet cannot perform any action in the real space. In short, interaction between the virtual pet and the real space is not to be presented.

SUMMARY OF THE INVENTION

Problems to be Solved by the Invention

The technology disclosed in this specification aims to provide an information processing apparatus and an information processing method, a display apparatus and a display method, and an information processing system, which excel in presenting interaction between a virtual object and the real space in a preferred manner.

Solutions to Problems

The present application has been made in view of the above problems, and the technology disclosed in claim 1 is an information processing apparatus that includes:

an output unit that applies action to an actual object; and a control unit that controls output from the output unit in accordance with action performed on the actual object by a virtual object, or action to be performed on the virtual object by the actual object.

According to the technology disclosed in claim 2 of the present application, the information processing apparatus disclosed in claim 1 further includes identification information for identifying the information processing apparatus.

According to the technology disclosed in claim 3 of the present application, the information processing apparatus disclosed in claim 1 further includes a receiving unit that receives a result of detection of action to be performed on the actual object by the virtual object. The control unit controls output from the output unit in accordance with the received result of detection.

According to the technology disclosed in claim 4 of the present application, the information processing apparatus disclosed in claim 1 further includes a virtual object control unit that controls action of the virtual object. The control unit controls output from the output unit, in accordance with the action of the virtual object controlled by the virtual object control unit.

According to the technology disclosed in claim 5 of the present application, the output unit of the information processing apparatus disclosed in claim 1 includes at least one of the following output devices incorporated into the actual object: a vibrating device, a pulse generating device, a heat generating device, a cooling device, an air blowing device, an acoustic device, a light emitting device, and a transfer device.

The technology disclosed in claim 6 of the present application is an information processing method that includes:

the step of acquiring action performed on an actual object by a virtual object, or action to be performed on the virtual object by the actual object; and the step of applying action to the actual object in accordance with the action performed on the actual object by the virtual object, or the action to be performed on the virtual object by the actual object.

The technology disclosed in claim 7 of the present application is a display apparatus that includes:

a detecting unit that detects a specific actual object; and a display unit that displays a virtual object in response to the detection of the specific actual object.

According to the technology disclosed in claim 8 of the present application, the detecting unit of the display apparatus disclosed in claim 7 identifies the actual object, and the display unit displays the virtual object corresponding to the identified actual object.

According to the technology disclosed in claim 9 of the present application, the detecting unit of the display apparatus disclosed in claim 7 identifies the actual object based on identification information accompanying the actual object, or identifies the actual object through object recognition.

According to the technology disclosed in claim 10 of the present application, the detecting unit of the display apparatus disclosed in claim 7 detects the actual object from the field of view of a user, and the display unit displays the virtual object overlapped on the actual object.

According to the technology disclosed in claim 11 of the present application, the display apparatus disclosed in claim 7 further includes a virtual object control unit that controls action of the virtual object.

According to the technology disclosed in claim 12 of the present application, the virtual object control unit of the display apparatus disclosed in claim 11 controls appearance or disappearance of the virtual object in accordance with motion of a user.

According to the technology disclosed in claim 13 of the present application, the virtual object control unit of the display apparatus disclosed in claim 11 controls the amount of information about the virtual object displayed on the display unit, in accordance with motion or a state of a user, or the time of the day.

According to the technology disclosed in claim 14 of the present application, the virtual object control unit of the display apparatus disclosed in claim 11 controls action of the virtual object on the actual object, or controls action of the virtual object in accordance with action to be received by the virtual object from the actual object.

According to the technology disclosed in claim 15 of the present application, the detecting unit of the display apparatus disclosed in claim 11 detects action of the virtual object on the actual object, or action to be received by the virtual object from the actual object, and the virtual object control unit controls action of the virtual object based on a result of the detection performed by the detecting unit.

According to the technology disclosed in claim 16 of the present application, the virtual object control unit of the display apparatus disclosed in claim 11 controls action of the virtual object to be synchronized with action of the actual object.

According to the technology disclosed in claim 17 of the present application, the display unit of the display apparatus disclosed in claim 7 is mounted on the head or a facial part of a user and is then used, and the display apparatus further includes a location/posture detecting unit that detects the location and the posture of the head or the facial part of the user. The display unit corrects display of the virtual object in the opposite direction from a change in the location or the posture of the head or the facial part of the user.

The technology disclosed in claim 18 of the present application is a display method that includes:

the detection step of detecting a specific actual object; and the display step of displaying a virtual object in response to the detection of the specific actual object.

The technology disclosed in claim 19 of the present application is an information processing system that includes:

a control apparatus that control action of a virtual object;

a display apparatus that detects an actual object and displays the virtual object corresponding to the actual object; and an output apparatus that applies action to the actual object in accordance with action performed on the actual object by the virtual object, or action to be performed on the virtual object by the actual object.

It should be noted that the term "system" means a logical assembly of devices (or functional modules that realize specific functions), and the respective devices or functional modules are not necessarily in a single housing (the same applies in the description below).

The technology disclosed in claim 20 of the present application is an information processing system that includes:

a display apparatus that detects an actual object and displays the virtual object corresponding to the actual object, and controls action of the virtual object; and an output apparatus that applies action to the actual object in accordance with action performed on the actual object by the virtual object, or action to be performed on the virtual object by the actual object.

Effects of the Invention

According to the technology disclosed in this specification, it is possible to provide an information processing apparatus and an information processing method, a display apparatus and a display method, and an information processing system, which excel in presenting interaction between a virtual object and the real space in a preferred manner.

Other objects, features, and advantages of the technology disclosed in this specification will be made apparent by the embodiments described below and the detailed descriptions with reference to the accompanying drawings.

BRIEF DESCRIPTION OF DRAWINGS

FIG. 29 is a diagram showing a modification 100-29 of the information processing system shown in FIG. 4.

MODES FOR CARRYING OUT THE INVENTION

The following is a detailed description of embodiments of the technology disclosed in this specification, with reference to the drawings.

Figure 1:
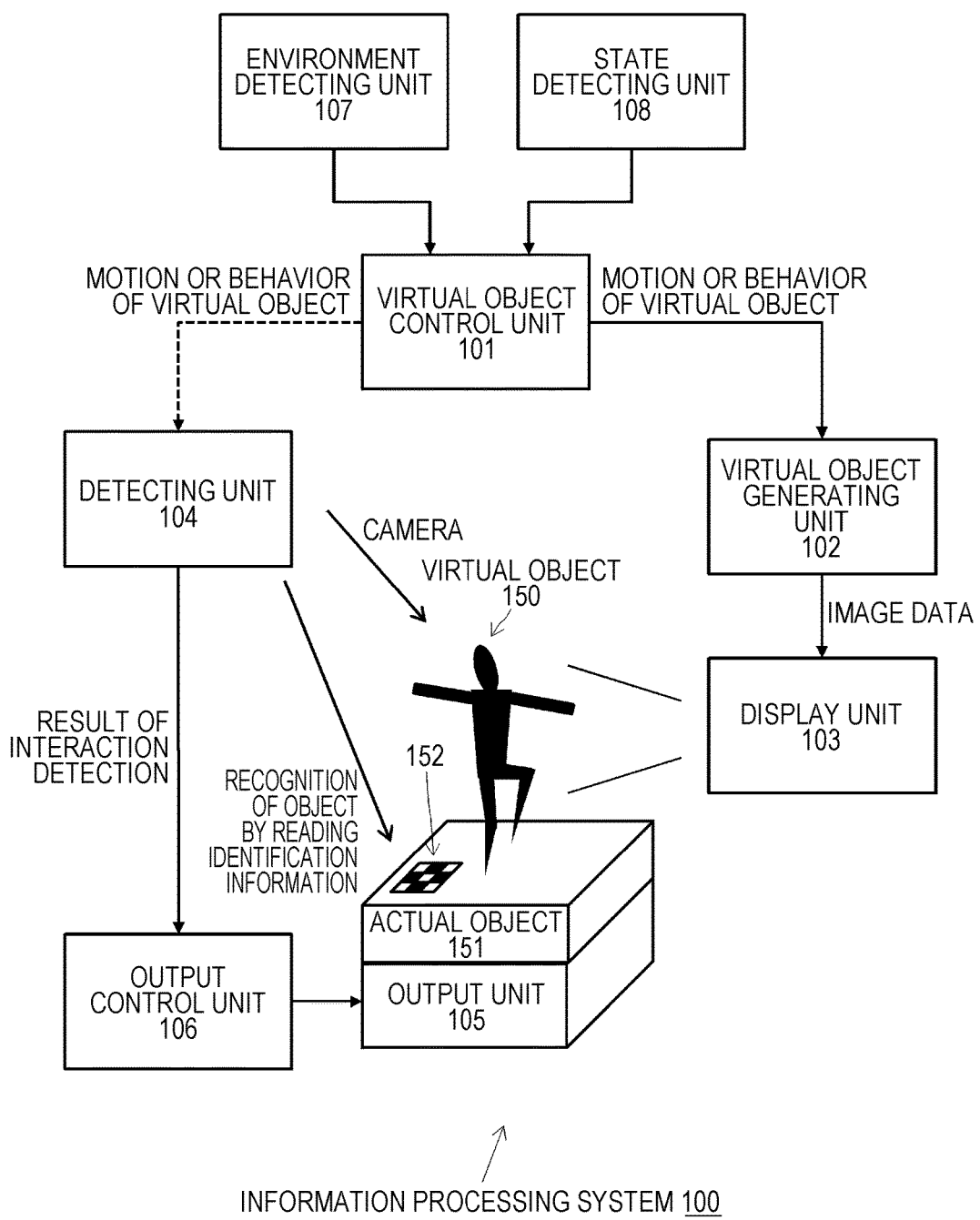
FIG. 1 is a diagram schematically showing the functional configuration of an information processing system 100 that presents an image of augmented reality to a user.

FIG. 1 schematically shows the functional configuration of an information processing system 100 that presents, to a user, an image of augmented reality or mixed reality formed by overlapping a virtual image on a real image. The information processing system. 100 shown in the drawing presents a virtual image by combining a virtual object 150 with the real space, and includes a virtual object control unit 101, a virtual object generating unit 102, a display unit 103, a detecting unit 104, an output unit 105, an output control unit 106, an environment detecting unit 107, and a state detecting unit 108.

A "virtual object" in this embodiment may be an avatar of a user, a character in a 2D or 3D game, or a user interface of a computer, for example. The virtual object 150 is not necessarily a person, but may be an animal such as a virtual pet. The virtual object 150 is not necessarily a living creature, either, and may be a moving object such as an automobile, a helicopter, or a vessel. The virtual object 150 may not be an image of an object, but may be text. The virtual object 150 may be a sound (a voice assistant not accompanied by any image display). In a case where the virtual object 150 is represented by a combination of an image of an object and a sound, the place of display of the image and the place of emission of the sound needs to be the same. In the description below, the virtual object 150 is a person, for ease of explanation. A method of combining a virtual object with a real image may be a method of overlapping a virtual image on the real space that is the field of view of a user observed with a see-through head mount display, or a method of overlapping a virtual image on an image of the real space captured with a camera like a video see-through head mount display.

The virtual object control unit 101 controls appearance of the virtual object 150 (in the real space), disappearance of the virtual object 150 (from the real space), and motion and behavior of the virtual object 150 being observed (in the real space). Basically, in accordance with a user's viewing or finding of an actual object 151, the virtual object control unit 101 causes virtual object 150 corresponding to the actual object 151 to appear (on the assumption that the virtual object 150 is associated with the actual object 151 in advance).

Here, the actual object 151 is provided with identification information 152 such as an IC tag or a bar code (or a QR code (registered trademark) or a DOT code). In a case where the actual object 151 is an information terminal having a display unit, such as a smartphone, the identification information 152 may be a displayed image of a bar code or the like. The actual object 151 may be a printed material or an object having features (or an object easily recognized in an image), and does not necessarily include the identification information 152 such as an IC tag. The above "in accordance with a user's viewing or finding of the actual object 151" is realized in practice by a process to recognize the identification information 152 provided on the actual object 151, or a process to identify the actual object 151 through object recognition in an image. Information about the virtual object 150 corresponding to respective pieces of identification information 152 is put into libraries.

Methods of causing the virtual object 150 to appear are classified into a PULL type by which the virtual object 150 appears in accordance with an appearance request made by the user through a gesture or an input operation or the like, and a PUSH type by which the virtual object 150 appears as a predetermined event that occurs on the system side, regardless of the intention of the user.

The above described method of causing the virtual object 150 corresponding to the actual object 151 to appear falls into the category of the PULL type. When the user takes of his/her eyes off the virtual object 150 or the area where the actual object 151 exists (or when a predetermined period of time has passed since the user took his/her eyes off the virtual object 150 or the area), or when the user loses interest in the virtual object 150 (such as when the user has not talked to the virtual object 150 for a predetermined period of time or longer), the virtual object control unit 101 causes the virtual object 150 to disappear.

In the case of the PUSH type, on the other hand, the virtual object 150 preferably appears in mode and timing comfortable to the user, regardless of whether the form of appearance is an image, text, or sound. For example, the appearance timing and the appearance mode of the virtual object 150 are controlled, while the action of the user is recognized. There might be a need to control the amount of information about the virtual object 150 in accordance with the action and the situation of the user, the time of the day, and the like (for example, the virtual object 150 may be rich content with an image when the user is sitting in a train, but the virtual object 150 is formed only with a sound when the user is walking along in a crowd). The virtual object 150 that appears by the PUSH-type method may be designed to disappear by a user operation, for example (the displayed virtual object 150 may be caused to disappear when the user pinches and moves the virtual object 150, or flicks the virtual object 150 away, for example). The above disappearance method can of course be applied to the virtual object 150 that appears by the PULL-type method.

The virtual object control unit 101 also causes the virtual object 150 to perform action on the actual object 151 as motion or behavior of the virtual object 150. The virtual object control unit 101 controls motion and behavior of the virtual object 150 based on one of the control rules (1) through (6) shown below, or a control rule formed with a combination of two or more rules (1) through (6) shown below, for example. That is, the virtual object 150 is automatically operated in some cases, and is operated by user operations in other cases.

(1) An automatic operation in accordance with the rules of the game the user is currently playing (2) The action or the operation the user is now performing in the real world (3) Action or the operation the user performs in a virtual space (such as an operation in a game via a mouse, a touch panel, or some other input device)

(4) The current state of the user in the real space (or a virtual space)

(5) The environments of the real space (or virtual space) in which the virtual object 150 exists (6) Action or reaction the actual object 151 (the output unit 105) performs on the virtual object 150

The virtual object generating unit 102 generates an image of the virtual object 150 such as a person or an animal whose appearance and disappearance, and action and operation are controlled by the virtual object control unit 101. In generating image data of the virtual object 150, it is possible to use various kinds of rendering techniques such as texture mapping, light sources, and shading. However, such techniques are not described in detail in this specification. The virtual object generating unit 102 may generate only text or sound in conjunction with an image of the virtual object 150, or may generate the virtual object 150 formed only with text or sound (as described above).

The display unit 103 combines the image of the virtual object 150 generated by the virtual object generating unit 102 with a real image, and outputs and displays the combined image onto the screen. In a case where the display unit 103 is formed as an image display apparatus (a head mount display) to be mounted on the head or a facial part of a user (as will be described later), an image of the virtual object 150 in the field of view of the user is overlapped on the real space as the field of view of the user, and is displayed in a see-through manner, or an image of the virtual object 150 in the field of view of the user is overlapped on an image of the real space captured with a camera, and is displayed in a video see-through manner. Alternatively, a projector-type image apparatus may be used as the display unit 103, and the virtual object 150 may be projected on an object in the real space. For example, in a case where the virtual object 150 appears in accordance with a user's viewing or finding of the actual object 151 (as described above), the virtual object 150 is overlapped on the actual object 151, and is then displayed.

The detecting unit 104 detects an event that occurs in the real space or a virtual space. For example, the detecting unit 104 includes a camera, and recognizes an image that is taken with the camera and exists in the field of view of a user. Based on the shape or the like of the image, the detecting unit 104 identifies the actual object 151 that is to perform action on the virtual object 150. Alternatively, in a case where the actual object 151 is provided with the identification information 152 such as an IC tag or a bar code (or a QR code (registered trademark) or a DOT code), the detecting unit 104 can identify the actual object 151 by reading the identification information 152. When the actual object 151 is identified, the corresponding virtual object 150 appears.

This embodiment is based on the assumption that there is interaction between the virtual object 150 and the actual object 151 existing in the real space. The detecting unit 104 detects such interaction, or more specifically, detects action the virtual object 150 performs on the actual object 151, reaction from the actual object 151, action the actual object 151 performs on the virtual object 150, and reaction from the virtual object 150. Action the virtual object 150 performs on the actual object 151 may be physical action such as the virtual object 150 going up on the actual object 151, the virtual object 150 stomping its feet on the actual object 151, or the virtual object 150 tapping on the actual object 151. The detecting unit 104 needs to constantly monitor interaction between the virtual object 150 and the actual object 151. However, there is no need to perform monitoring when the virtual object 150 is not seen, and therefore, the camera may be turned off, to reduce power consumption.

The detecting unit 104 may analyze an image of the virtual object 150 displayed on the display unit 103, detect the action the virtual object 150 is performing on the actual object 151, or acquire information about the action directly from the virtual object control unit 101 that controls motion or behavior of the virtual object 150.

The detecting unit 104 also detects action the output unit 105 performs on the virtual object 150 through the actual object 151 (as will be described later). For example, based on a result of analysis of an image of the virtual object 150 that is overlapped on the actual object 151 and is then displayed, or based on a result of recognition of an image taken with the camera, the detecting unit 104 can detect action performed by the actual object 151. Alternatively, the detecting unit 104 may receive feedback from the output control unit 106 about action the output unit 105 is made to perform on the virtual object 150. The result of this detection is reported to the virtual object control unit 101. The virtual object control unit 101 then controls reaction of the virtual object 150 to the action performed by the output unit 105.

The detecting unit 104 also detects interaction between the user and the virtual object 150 (in a case where the actual object 151 is part of the body of the user, for example). In detecting action or reaction performed by the user, gesture recognition or voice recognition or the like to which a motion-capture technology is applied is used.

The detecting unit 104 may determine the mental state (excited or composed) or some other state of the virtual object 150 based on the expression on the virtual object 150 displayed on the display unit 103 or the context of behavior of the virtual object 150. Alternatively, the detecting unit 104 may acquire information about the mental state of the virtual object 150 from the virtual object control unit 101, and report the information to the output control unit 106. With this, the output control unit 106 can control operation of the output unit 105 and give tactile feedback to the user about action or reaction in accordance with the mental state of the virtual object 150 (as will be described later).

The output unit 105 causes the actual object 151 on which the virtual object 150 performs action, to generate an output such as vibration, electric pulse, heat or cooling air, wind, sound, light, a transfer, or a jump. In this manner, reaction from the actual object 151 is realized. So as to generate such an output, the output unit 105 includes at least one of the output devices: a vibrating device, a pulse generating device, a heat generating device, a cooling device, an air blowing device, an acoustic device, a light emitting device, and a transfer device such as a wheel. Alternatively, the output unit 105 including those output devices is incorporated into the actual object 151 (in other words, the actual object 151 may include the output unit 105 therein). In the description below, the actual object 151 includes the output unit 105 therein, for ease of explanation.

The output control unit 106 controls driving of the respective output devices constituting the output unit 105 as reaction to the action that is detected by the detecting unit 104 and is performed by the virtual object 150 on the actual object 151. For example, in accordance with the strength of the force of the virtual object 150 stomping (or tapping) its feet on the actual object 151, the output control unit 106 adjusts outputs from the respective output devices 1101 through 1108 (described later with reference to FIG. 11) of the output unit 105, such as the amplitude and the period of vibration, an amount of heat generation, a volume of voice or sound, or an amount of luminescence, and performs reaction through the actual object 151. In this manner, interaction between the virtual object 150 and the real space is realized. The output control unit 106 creates the feeling that the virtual object 150 actually exists in the place by causing the output unit 105 to perform reaction while maintaining precise synchronization with action performed by the virtual object 150 (or with the operation of the virtual object 150 displayed on the display unit 103).

The output control unit 106 can also cause the output unit 105 to perform action on the virtual object 150, instead of reaction to action of the virtual object 150. For example, the output control unit 106 can perform action on the virtual object 150, such as swaying, heating, cooling, or blowing air to the virtual object 150.

The environment detecting unit 107 detects information about the environments of the real space surrounding the virtual object 150 and the user. The virtual object control unit 101 may receive the environmental information detected by the environment detecting unit 107 as necessary, and use the environmental information in controlling motion and behavior of the virtual object 150. The output control unit 106 may also adjust outputs of the output unit 105 in accordance with the environmental information, and take the influence of the environments into account in expressing interaction between the virtual object 150 and the actual object 151.

The environment detecting unit 107 detects environmental information such as environmental light intensity, sound intensity, a location or a place, temperature, weather, time, an image of the surroundings, the number of persons existing outside, and the like. So as to detect such environmental information, the environment detecting unit includes various kinds of environmental sensors such as a light volume sensor, a microphone, a GPS (Global Positioning System) sensor, a temperature sensor, a humidity sensor, a clock, an image sensor (a camera), and a radiation sensor.

The state detecting unit 108 detects the state of the user using the virtual object 150 (or the user observing the virtual object 150). The virtual object control unit 101 receives the state information detected by the state detecting unit 108 as necessary, and uses the state information in controlling the timing of appearance and disappearance of the virtual object 150, and controlling motion and behavior of the virtual object 150. The output control unit 106 may also adjust outputs of the output unit 105 in accordance with the state information, and take the influence of the state of the user into account in expressing interaction between the virtual object 150 and the real space.

So as to follow the movement of the head of the user, the state detecting unit 108 acquires information about the location of the head of the user and the posture of the user, or information about the posture of the user, for example. So as to follow the movement of the head of the user, the state detecting unit 108 is a sensor that can detect nine axes in total, including a triaxial gyro sensor, a triaxial acceleration sensor, and a triaxial geomagnetic sensor, for example. The state detecting unit 108 may further include a combination of one or more of the following sensors: a GPS (Global Positioning System) sensor, a Doppler sensor, an infrared sensor, a radio field intensity sensor, and the like.

So as to acquire location information, the state detecting unit 108 may also use a combination of information provided from various kinds of infrastructures, such as cellular phone base station information and PlaceEngine (registered trademark) information (electrically-measured information from a wireless LAN access point).

The state detecting unit 108 also detects the working state of the user, the state of action of the user (a transfer state such as a resting state, a walking state, or a running state, the opened/closed state of the eyelids, or the direction of the line of sight), the mental state of the user (the level of sensation, excitement, consciousness, feeling, or emotion, such as whether the user is absorbed in or concentrates on observing a virtual object), and the physiological state of the user. So as to acquire such state information from the user, the state detecting unit 108 may include various kinds of state sensors such as a camera that captures the face of the user, a gyro sensor, an acceleration sensor, a velocity sensor, a pressure sensor, a temperature sensor that senses body temperature or atmospheric temperature, a perspiration sensor, a myoelectric potential sensor, an ocular potential sensor, a brain-wave sensor, an inlet air sensor, and a gas sensor, as well as a timer.

The environment detecting unit 107 and the state detecting unit 108 are arbitrary components in the information processing system 100. The virtual object control unit 101 arbitrarily controls motion or behavior of the virtual object 150 based on environmental information and state information.

The information processing system 100 having the structure illustrated in FIG. 1 might be realized by one device, or might be realized by two or more devices that are physically independent but are connected to each other by a network or the like.

Figure 2:
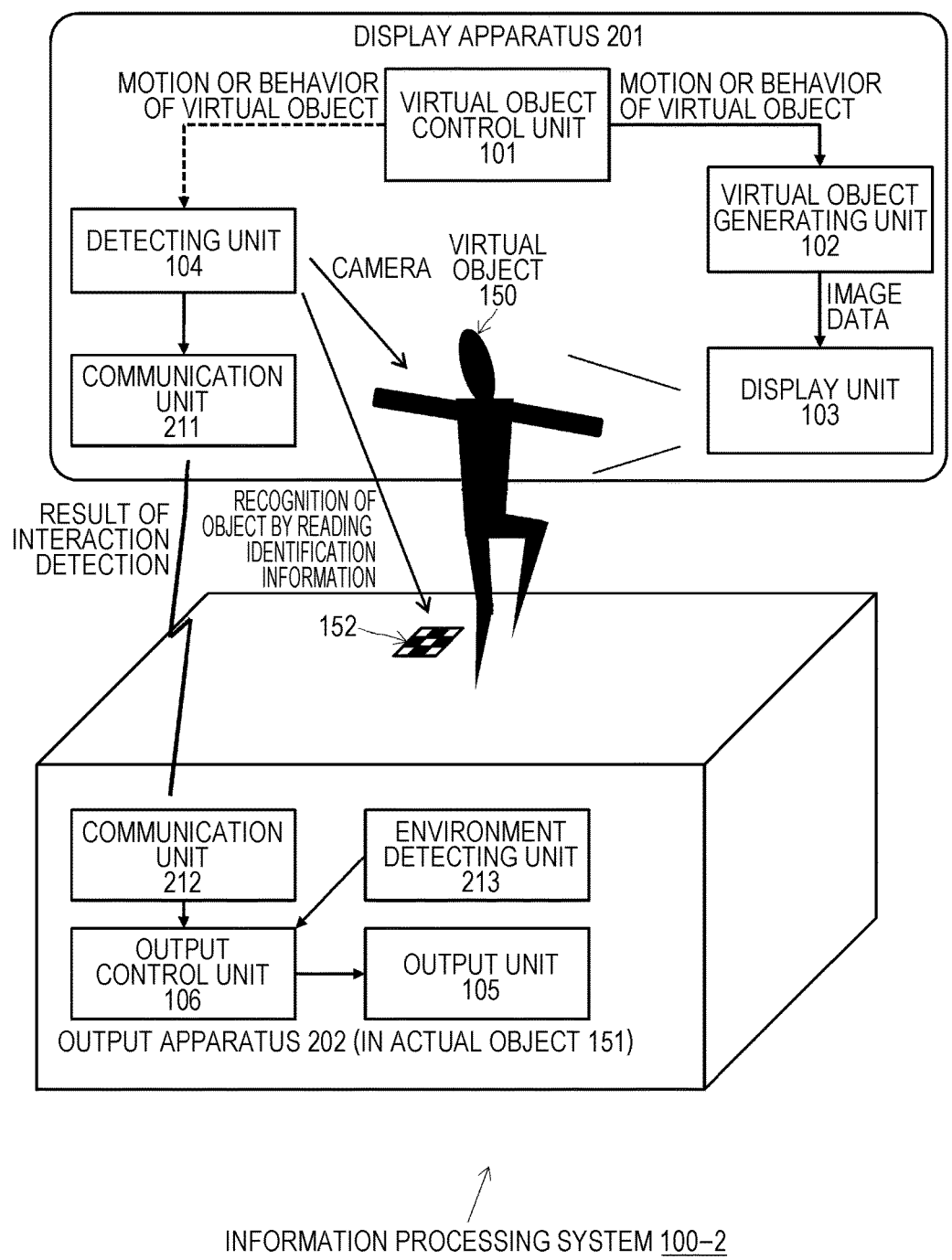
FIG. 2 is a diagram specifically showing an example structure 100-2 of an information processing system.

FIG. 2 shows a specific example structure 100-2 of an information processing system. In the example shown in the drawing, the information processing system 100-2 is formed with the two physically-independent devices: a display apparatus 201 that displays a virtual object 150 combined with the real space; and an output apparatus 202 that expresses interaction performed by the virtual object 150 in the real space.

The display apparatus 201 is the console of a gaming device, for example, and includes a virtual object control unit 101, a virtual object generating unit 102, a display unit 103, and a detecting unit 104.

The virtual object control unit 101 controls appearance and disappearance of the virtual object 150, and motion or behavior of the virtual object 150 in accordance with the rules of a game or the like. The virtual object generating unit 102 generates an image of the virtual object 150. The display unit 103 combines the image of the virtual object 150 generated by the virtual object generating unit 102 with a real image in an overlapping manner, and outputs and displays the combined image onto the screen. The detecting unit 104 constantly monitors motion and behavior of the virtual object 150 being controlled by the virtual object control unit 101, and detects action performed by the virtual object 150 in the real space (or in a virtual space).

Although not shown in FIG. 2, the environment detecting unit 107 and/or the state detecting unit 108 may be included in the display apparatus 201. The virtual object control unit 101 may change motion or behavior of the virtual object 150, or the action to be performed on an actual object 151, as if affected by detected environmental information or state information.

The output apparatus 202 includes an output control unit 106 and an output unit 105 that are installed in the actual object 151. The output control unit 106 controls driving of the respective output devices constituting the output unit 105 in accordance with the action the virtual object 150 is performing on the actual object 151. In this manner, reaction to the virtual object 150 is realized. Alternatively, the output control unit 106 performs output control on the output unit 105 so that the output apparatus 202 performs action on the virtual object 150.

The display apparatus 201 and the output apparatus 202 include a communication unit 211 and a communication unit 212, respectively. For example, the display apparatus 201 transmits information about action of the virtual object 150 detected by the detecting unit 104, or information about action of the virtual object 150 designated by the virtual object control unit 101, to the output apparatus 202 via the communication unit 211. In the output apparatus 202, on the other hand, when the communication unit 212 receives information about action from the display apparatus 201, the output control unit 106 controls driving of the respective output devices constituting the output unit 105 as reaction to the action the virtual object 150 is performing on the actual object 151.

The communication units 211 and 212 are connected by an arbitrary communication means such as wireless or cable communication. Here, the communication means may be MHL (Mobile High-definition Link), USB (Universal Serial Bus), HDMI (registered trademark) (High Definition Multimedia Interface), Wi-Fi (registered trademark), Bluetooth (registered trademark) communication, BLE (Bluetooth (registered trademark) Low Energy) communication, ultra-low power consumption wireless communication such as ANT, a mesh network standardized by IEEE802.11s or the like, infrared communication, intra-body communication, or signal transmission via conductive fibers, for example.

The output apparatus 202 may further include an environment detecting unit 213. The environment detecting unit 213 detects information about the real space surrounding the virtual object 150 performing action on the actual object 151. In such a case, the output control unit 106 can adjust outputs of the output unit 105 in accordance with the environmental information, and take the influence of the environments into account in expressing interaction between the virtual object 150 and the real space.

The output apparatus 202 can be designed as a special-purpose hardware apparatus that expresses interaction performed by the virtual object 150 in the real space, for example. So as to express reaction to action performed by the virtual object 150 in various forms such as vibration of the actual object 151, heating or cooling, wind, sound, light emission, a transfer, or a jump, the output unit 105 in this case includes many kinds of output devices such as a vibrating device, a pulse generating device, a heat generating device, a cooling device, an air blowing device, an acoustic device, a light emitting device, and a transfer device. The output apparatus 202 can also cause those output devices to perform action on the virtual object 150, instead of reaction to action of the virtual object 150. For example, the output apparatus 202 can perform action on the virtual object 150, such as swaying, heating, cooling, or blowing air to the virtual object 150.

Alternatively, the output apparatus 202 can be formed not as a special-purpose hardware apparatus, but as an existing electronic apparatus such as a smartphone or a multifunctional terminal having a vibration function and a speaker. In this case, the types of output devices installed as the output unit 105 are limited, and the forms of expression of interaction between the virtual object 150 and the actual object 151 are also limited.

To make the interaction look real, it is important that action and reaction performed between the virtual object 150 and the actual object 151 are precisely in synchronization with each other, or that motion of the virtual object 150 displayed on the display unit 103 and driving of the output unit 105 in the output apparatus 202 are precisely in synchronization with each other. If synchronization is not well maintained due to an excessively long delay of reaction to action, the interaction will look unnatural. It should be noted that, where the virtual object 150 is constantly in motion, it tends to look to the user as though interaction were being performed in real time.

Figure 3:
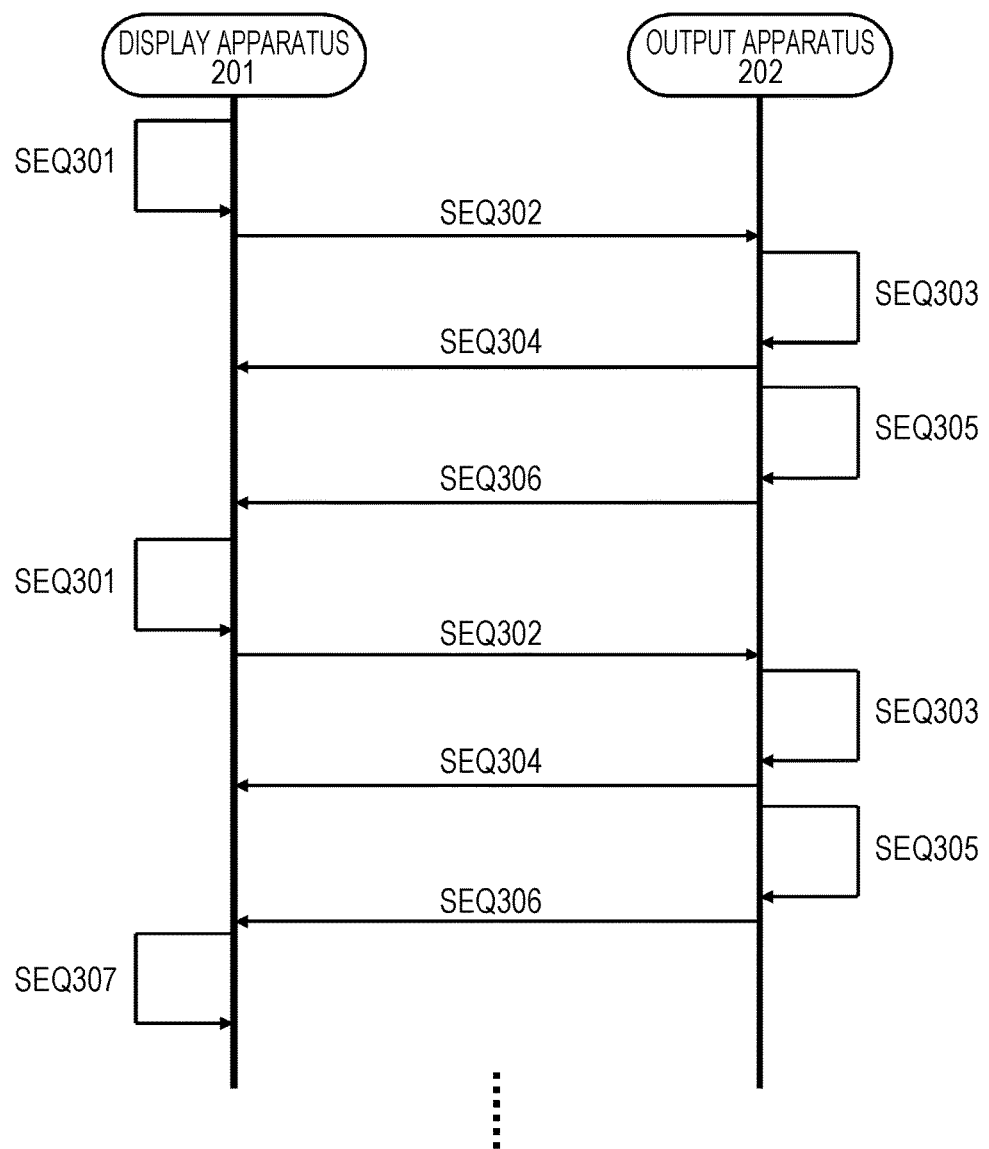
FIG. 3 is a diagram showing an example communication sequence in the information processing system 100-2.

FIG. 3 shows an example communication sequence in the information processing system 100-2.

After identifying the actual object 151 by reading identification information 152 or recognizing the object, the display apparatus 201 combines the virtual object 150 corresponding to the identified actual object 151 with the real space, and displays the combined image (SEQ301). The display apparatus 201 refreshes motion or behavior of the virtual object 150 at predetermined control intervals.

After detecting action performed by the virtual object 150 on the actual object 151, the display apparatus 201 transmits a message containing a result of the detection to the output apparatus 202 at predetermined intervals, for example (SEQ302). Here, the display apparatus 201 may not transmit information about the action of the virtual object 150, but may convert the information into an instruction to express reaction to the action of the virtual object 150 with the actual object 151 or into control information for the output unit 105, and then transmit the instruction or the control information.

Every time receiving the message from the display apparatus 201, the output apparatus 202 in return operates the output unit 105 as reaction of the actual object 151 (SEQ303), to express interaction between the virtual object 150 and the actual object 151. Here, if the reaction of the actual object 151 is performed precisely in synchronization with the action the virtual object 150 performs on the actual object 150, the user can get the impression that the interaction is real.

The output apparatus 202 may also return, to the display apparatus 201, a confirmation response to the message from the display apparatus 201, a report of completion of a reaction output (interaction), or the like (SEQ304).

The output apparatus 202 can also perform action on the virtual object 150, instead of reaction of the actual object 151 to action of the virtual object 150 (SEQ305). In such a case, the output apparatus 202 may transmit information about action performed by the output unit 105 to the display apparatus 201, so that the virtual object 150 can perform reaction (SEQ306).

Receiving the information about the action on the virtual object 150 from the output apparatus 202, the display apparatus 201 generates an image of the virtual object 150 that is to perform reaction to the action, combines the image with the actual object 151 in the real space, and displays the combined image. If the reaction of the virtual object 150 is performed precisely in synchronization with (or slightly after) the action performed by the output apparatus 202 or the actual object 151, the user can get the impression that interaction is actually being performed.

Figure 4:
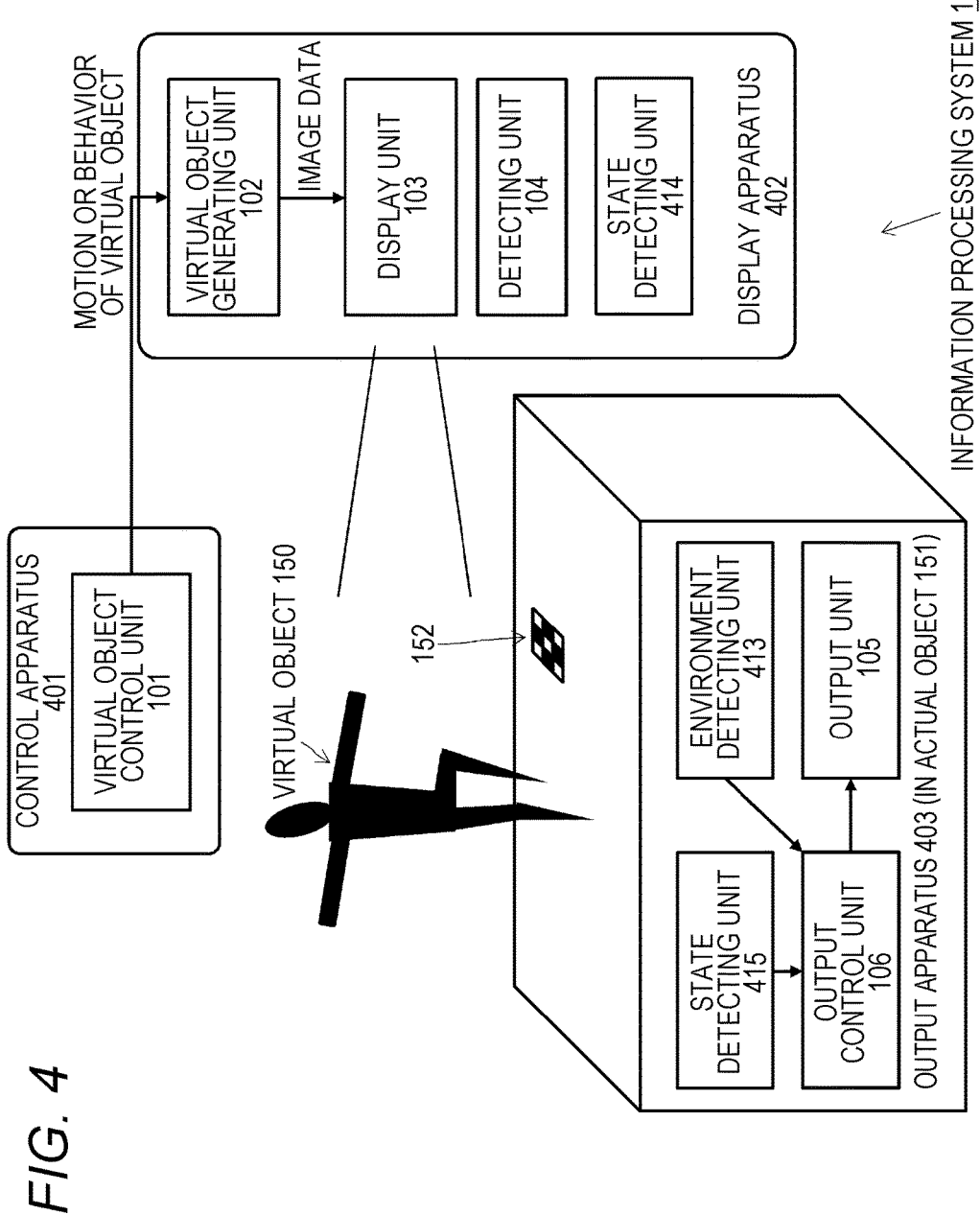
FIG. 4 is a diagram specifically showing an example structure 100-4 of an information processing system.

FIG. 4 shows another specific example structure 100-4 of an information processing system. In the example shown in the drawing, the information processing system 100-4 is formed with the three physically-independent devices: a control apparatus 401 that controls appearance and disappearance, and motion or behavior of a virtual object 150; a display apparatus 402 that displays the virtual object 150 combined with the real space; and an output apparatus 403 that expresses interaction between the virtual object 150 and the real space.

The control apparatus 401 may be a server installed in a house or a cloud, and the display apparatus 402 may be a user terminal that logs into the server, for example. There are cases where user terminals concurrently log into the same server. In such a case, it is also assumed that the user terminals share the single output apparatus 403 (as will be described later with reference to FIG. 25). For example, virtual objects corresponding to the respective user terminals appear, and the single output apparatus 403 can perform reaction to the respective virtual objects.

Although not shown in the drawing, the control apparatus 401 and the display apparatus 402, the display apparatus 402 and the output apparatus 403, and the output apparatus 403 and the control apparatus 401 are connected to each other by a wireless or cable communication means. For the connection, it is possible to use a communication medium (not shown) such as a LAN (Local Area Network) such as a home network, or a wide area network such as the Internet.

The control apparatus 401 includes a virtual object control unit 101, and controls appearance and disappearance, and motion or behavior of the virtual object 150 in accordance with the rules of a game, the context of behavior of the user, or the like. Alternatively, the control apparatus 401 can be formed with a single server device installed in the Internet, or a combination of server devices.

The display apparatus 402 includes a virtual object generating unit 102, a display unit 103, and a detecting unit 104. The virtual object generating unit 102 receives information about motion or behavior of the virtual object 150 from the control apparatus 402, and then generates an image of the virtual object 150. The display unit 103 combines the image of the virtual object 150 generated by the virtual object generating unit 102 with the corresponding actual object 151 in an overlapping manner, and outputs and displays the combined image onto the screen. The detecting unit 104 constantly monitors motion and behavior of the virtual object 150 being controlled by the virtual object control unit 101 (or constantly monitors the image of the virtual object 150 displayed on the display unit 103), and detects action performed by the virtual object 150 on the virtual object 151.

The display apparatus 402 may include an environment detecting unit and/or a state detecting unit. In the example illustrated in the drawing, the display apparatus 402 includes a state detecting unit 414. After receiving environmental information or state information detected by the display apparatus 402, the virtual object control unit 101 may change the action to be performed on the actual object 151 as if the virtual object 150 were affected by the environments or circumstances at the time of moving or behaving. The state detecting unit 414 includes sensors that detect the location and the posture of the display apparatus 402, such as an acceleration sensor and a gyro sensor. To move the display position of the virtual object 150 on the screen in accordance with the movement of the field of view, results of detection performed by the acceleration sensor, the gyro sensor, and the like are used.

The output apparatus 403 includes an output control unit 106 and an output unit 105 that are installed in the actual object 151. The output control unit 106 controls driving of the respective output devices constituting the output unit 105 as reaction of the actual object 151 to the action the virtual object 150 is performing on the actual object 151. After receiving a result of detection of action of the virtual object 150 from the display apparatus 402 or the like, or receiving information about action such as motion or behavior of the virtual object 150 directly from the control apparatus 401, the output apparatus 403 outputs reaction to the virtual object 150 from the output unit 105 based on the received result or information, to express interaction between the virtual object 150 and the real space.

The output apparatus 403 may further include an environment detecting unit 413. The environment detecting unit 413 detects information about the real space surrounding the virtual object 150 performing action on the actual object 151. In such a case, the output control unit 106 can adjust outputs of the output unit 105 in accordance with the environmental information, and take the influence of the environments into account in expressing interaction to be performed with the virtual object 150.

The output apparatus 202 may further include a state detecting unit 415. The state detecting unit 415 includes a gyro sensor, for example, and detects a change caused in the location or the posture of the actual object 151 when action or reaction is performed on the virtual object 150. In the control apparatus 401, action of the virtual object 150 placed on the actual object 151 is controlled in accordance with the above described change in the location or the posture of the actual object 151, so that interaction between the virtual object 150 and the actual object 151 can be made more real.

Figure 5:
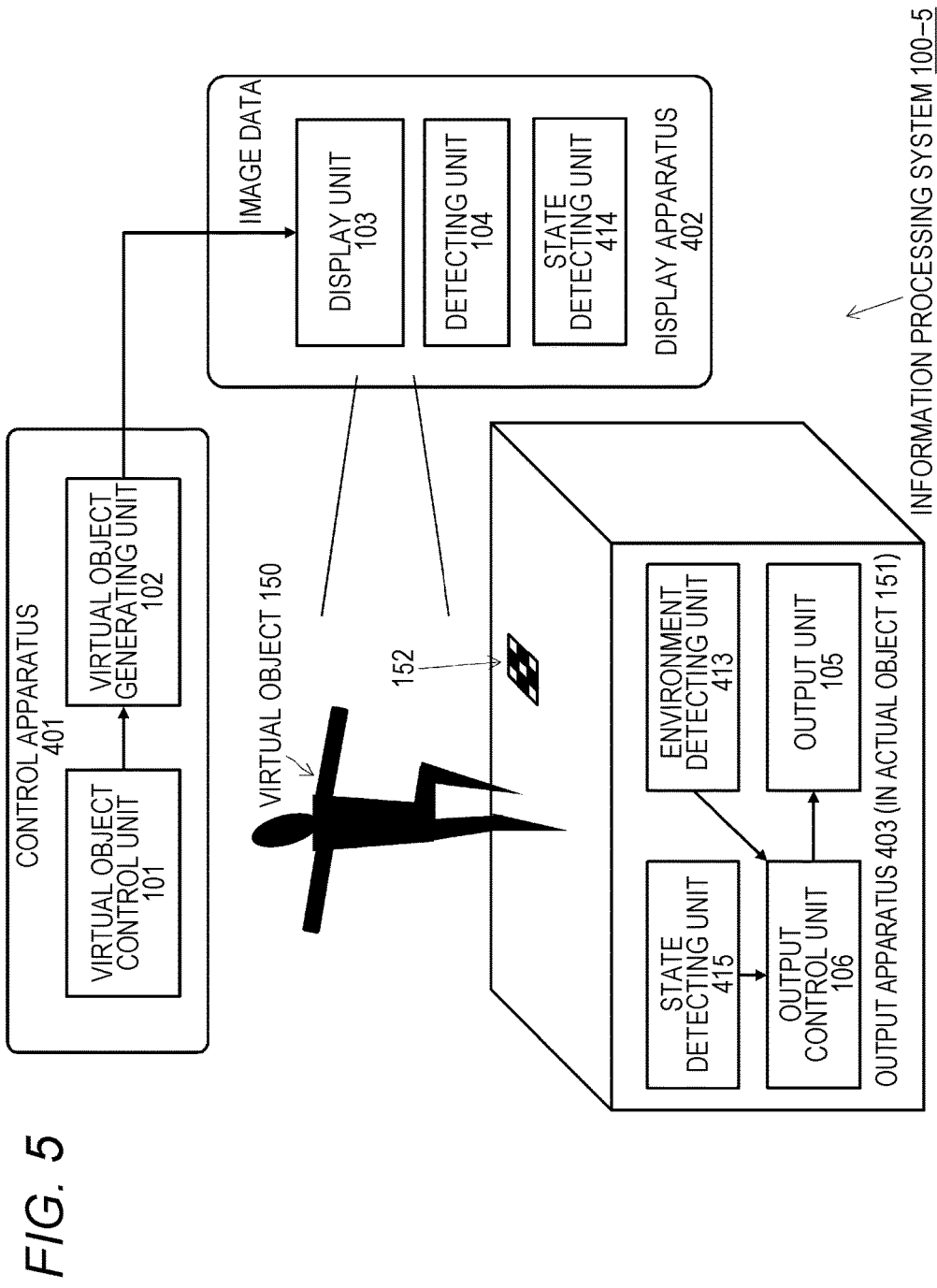
FIG. 5 is a diagram specifically showing a modification 100-5 of the information processing system shown in FIG. 4.

FIG. 5 shows a modification 100-5 of the information processing system shown in FIG. 4. While the virtual object generating unit 102 is included in the display apparatus 402 in the example illustrated in FIG. 4, the virtual object generating unit 102 is included in the control apparatus 401 such as the console of a gaming device in the example illustrated in FIG. 5. Although not shown in the drawing, the control apparatus 401 and the display apparatus 402, the display apparatus 402 and the output apparatus 403, and the output apparatus 403 and the control apparatus 401 are connected to each other by a wireless or cable communication means.

Although only one display apparatus 202 is shown in either of FIGS. 4 and 5, more than one display apparatus 202 may exist in the information processing system 100-4 or 100-5 in some example system configuration. In such a case, one control apparatus 402 might transmit information about motion or behavior of respective virtual objects, or images of the respective virtual objects, to the respective display apparatuses. For example, the control apparatus 401 as the console of a gaming device may transmit information about the same virtual object or virtual objects (such as avatars or characters in a game) unique to respective users, to the display apparatuses 402 as the game controllers owned by the respective users participating in the game. The control apparatus 401 may transmit information about virtual objects (virtual objects for the respective users) such as avatars of the other users existing near the user, as well as the avatar of the user, to the respective display apparatuses (as will be described later with reference to FIG. 25).

To make interaction between the virtual object 150 and the actual object 151 look real, it is important that action and reaction performed between the virtual object 150 and the actual object 151 are precisely in synchronization with each other, or that motion of the virtual object 150 displayed on the display unit 103 and driving of the output unit 105 in the output apparatus 202 are precisely in synchronization with each other. If synchronization is not well maintained due to an excessively long delay of reaction to action, the interaction will look unnatural. Where the virtual object 150 is constantly in motion, it is easy to give the user the impression that interaction is being performed in real time.

Figure 6:
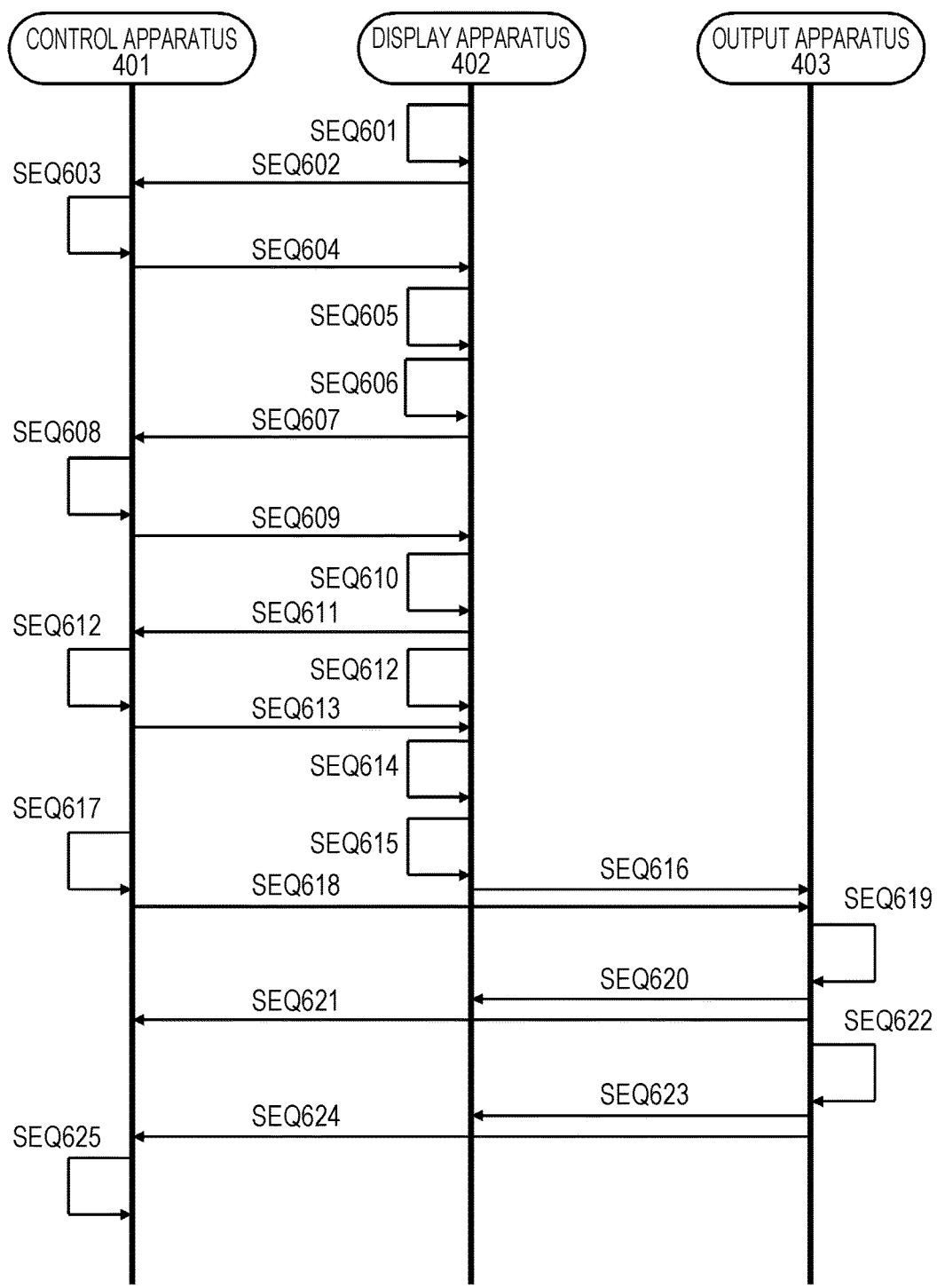
FIG. 6 is a diagram showing an example communication sequence in the information processing system 100-4.

FIG. 6 shows an example communication sequence in the information processing system 100-4 (or 100-5).

After the display apparatus 402 identifies the actual object 151 by reading the identification information 152 or recognizing the object in the field of view of a user, for example (SEQ601), the display apparatus 402 notifies the control apparatus 401 to that effect (SEQ602).

The control apparatus 401 in return causes the virtual object 150 corresponding to the read identification information 152 to appear (SEQ603), and transmits information about motion or behavior of the virtual object 150, or the image data of the virtual object 150 extracted from the information, to the display apparatus 402 (SEQ604). The control apparatus 401 also refreshes motion or behavior of the virtual object 150 at predetermined control intervals. The display apparatus 402 then combines the image data with the real space, and displays an image of the virtual object 150 corresponding to the identified actual object 151 (SEQ605).

After detecting information about the state of the display apparatus 402 or the user using the display apparatus 402, or information about the environments around the user (SEQ606), the display apparatus 402 transmits a result of the detection to the control apparatus 401 (SEQ607). The control apparatus 401 then updates the image in accordance with the received state information (SEQ608), and transmits necessary information to the display apparatus 402 (SEQ609).

In accordance with a change in the location or the posture of the user using the display apparatus 402, the real image displayed through the display apparatus 402 in a see-through manner or a video see-through manner moves. In a case where the display apparatus 402 is a type of apparatus to be worn by a user, such as a head mount display, or in a case where the display apparatus 402 is an apparatus mounted on a moving object, for example, to overlap the virtual object 150 on the actual object 151, it is necessary to detect the movement of the field of view of the user, and move the display position of the virtual object 150 on the screen in the opposite direction from the movement of the field of view of the user. The display area of the virtual object 150 is moved so as to offset movement of the head. In this manner, the movement of the virtual object 150 that follows the movement of the head of the user can be presented.

In view of this, the display apparatus 402 includes sensors that detect the location and the posture of the display apparatus 402, such as an acceleration sensor and a gyro sensor. After detecting the location or the posture with an acceleration sensor, a gyro sensor, or the like (SEQ610), the display apparatus 402 transmits a result of the detection to the control apparatus 401 (SEQ611). The control apparatus 401 then moves the display area of the virtual object 150 so as to offset the movement of the head of the user, and performs image correction so that the virtual object 150 is overlapped on an appropriate portion (or on the actual object 151, for example) in the real space (SEQ612). Alternatively, such image correction may be performed by the display apparatus 402.

Even if image correction is performed so that the display area of the virtual object 150 is moved to offset the movement of the head of the user, there is the problem of latency, and there is a risk that the virtual object 150 will be displayed in a wrong position, failing to follow the movement of the field of view of the user due to shaking of the head of the user. Therefore, servo control (D (differential) control of PID control) and motion prediction are performed in this embodiment so that deviation of the display position of the virtual object 150 becomes zero at a certain time.

The control apparatus 401 transmits information about the virtual object 150 subjected to the image correction, to the display apparatus 402 (SEQ613), and the display apparatus 402 displays the corrected virtual object 150 (SEQ614) (in the same manner as above).

After detecting reaction performed by the virtual object 150 on the actual object 151 (SEQ615), the display apparatus 402 transmits a message containing a result of the detection to the output apparatus 403 at predetermined intervals, for example (SEQ616). Alternatively, the control apparatus 401 instructs the virtual object 150 to perform action (SEQ617), and notifies the output apparatus 403 to that effect (SEQ618).

Every time receiving the message from the display apparatus 402 or the control apparatus 401, the output apparatus 403 in return operates the output unit 105 as reaction of the actual object 151 (SEQ619), to express interaction between the virtual object 150 and the real space. Here, if the reaction of the actual object 151 is performed precisely in synchronization with the action the virtual object 150 performs on the actual object 150, the user can get the impression that the interaction with the virtual object 150 is actually being performed in the real space.

The output apparatus 403 may also return, to the display apparatus 402 or the control unit 401, a confirmation response to the message from the display apparatus 402 or the control unit 401, a report of completion of a reaction output (interaction), or the like (SEQ620, SEQ621).

The output apparatus 202 can also perform action on the virtual object 150, instead of reaction of the actual object 151 to action of the virtual object 150 (SEQ622). In such a case, the output apparatus 403 may transmit information about action performed by the output unit 105 to the control apparatus 401 or the display apparatus 402, so that the virtual object 150 can perform reaction (SEQ623, SEQ624).

In this case, the control apparatus 401 causes the virtual object 150 to perform reaction to the action of the actual object 151, so that interaction between the virtual object 150 and the real space can be expressed (SEQ625). If the reaction of the virtual object 150 is performed precisely in synchronization with the action performed by the output apparatus 202 or the actual object 151, the interaction looks real to the user.

FIG. 29 shows another modification 100-29 of the information processing system shown in FIG. 4. In FIG. 29, the functions in the control apparatus 401, such as the virtual object control unit 101, are integrated with the output apparatus 403. In FIG. 4, the control apparatus 401 is assumed to be a server in a cloud (as described above). In FIG. 29, on the other hand, the output apparatus 403 is assumed to be the console of a gaming device installed in a house, and the display apparatus 402 is assumed to be a game controller connected to the console of the gaming device. It is also possible that the gate controllers of users are connected to the console of a single gaming device.

The virtual object control unit 101 in the output apparatus 403 controls appearance and disappearance of the virtual object 150, and motion or behavior of the virtual object 150 in accordance with the rules of a game or the like.

Meanwhile, the virtual object generating unit 102 in the display apparatus 402 receives information about motion or behavior of the virtual object 150 from the virtual object control unit 101, and then generates an image of the virtual object 150. The display unit 103 combines the image of the virtual object 150 generated by the virtual object generating unit 102 with a real image in an overlapping manner, and outputs and displays the combined image onto the screen.

When the output control unit 106 in the output apparatus 403 receives information about action the virtual object 150 is performing on the actual object 151 from the virtual object control unit 101, the output control unit 106 controls driving of the respective output devices constituting the output unit 105 as reaction of the actual object 151.

In the example system configuration shown in FIG. 29, the communication operation between the control apparatus 401 and the output apparatus 403 in the communication sequence shown in FIG. 6 is replaced with an information transfer operation in the output apparatus 403.

To give the user the impression that interaction is actually being performed, it is important that action and reaction performed between the virtual object 150 and the actual object 151 are precisely in synchronization with each other, or that motion of the virtual object 150 displayed on the display unit 103 and driving of the output unit 105 in the output apparatus 202 are precisely in synchronization with each other. If synchronization is not well maintained due to an excessively long delay of reaction to action, the user gets the impression that the interaction is unnatural. Where the virtual object 150 is constantly in motion, it is easy to give the user the impression that reaction is being performed in real time.

Other than appearing as an image as shown in FIGS. 2, 4, 5, and 29, the virtual object 150 can appear in various forms. For example, the virtual object 150 appears as an image accompanied by voice such as speech of the virtual object 150 in some cases, and any image is not displayed but only speech of the virtual object 150 is emitted from a predetermined direction in other cases. The method of causing the virtual object 150 to appear may be a PULL type by which the virtual object 150 appears in accordance with an appearance request made by the user through a gesture or an input operation or the like, or a PUSH type by which the virtual object 150 appears as a predetermined event that occurs on the system side, regardless of the intention of the user.

Each of the display apparatus 201 shown in FIG. 2 and the display apparatuses 402 shown in FIGS. 4, 5, and 29 can be formed as an image display apparatus (a head mount display) to be mounted on the head or a facial part of a user.

Figure 24A:
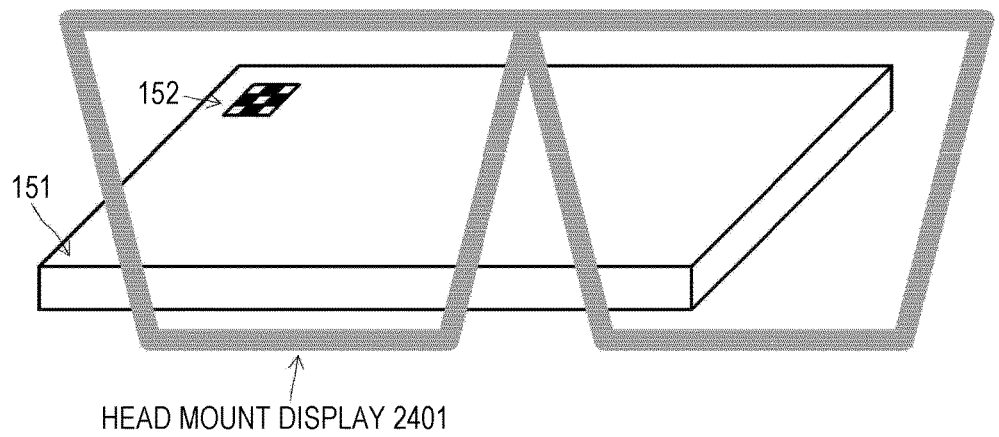
FIG. 24A is a diagram showing a situation where a user is observing an actual object 151 through a head mount display 2401.

FIG. 24A shows a situation where an actual object 151 having identification information 152 attached thereto is being observed by a user through a head mount display 2401.

Figure 24B:
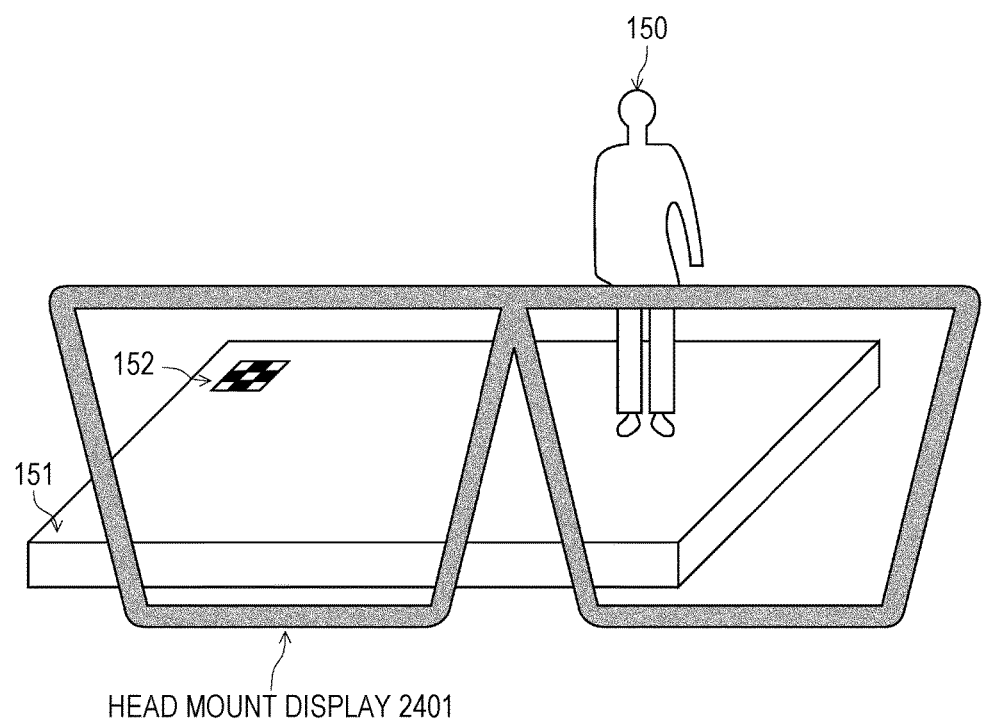
FIG. 24B is a diagram showing a situation where the user is observing a virtual object 150 through the head mount display 2401.

As described above, the virtual object 150 corresponding to the actual object 151 (or the identification information 152) appears in accordance with a user's viewing or finding of the actual object 151. FIG. 24B shows a situation where the virtual object 150 that has appeared is being observed by the user through the head mount display 2401.

Figure 25:
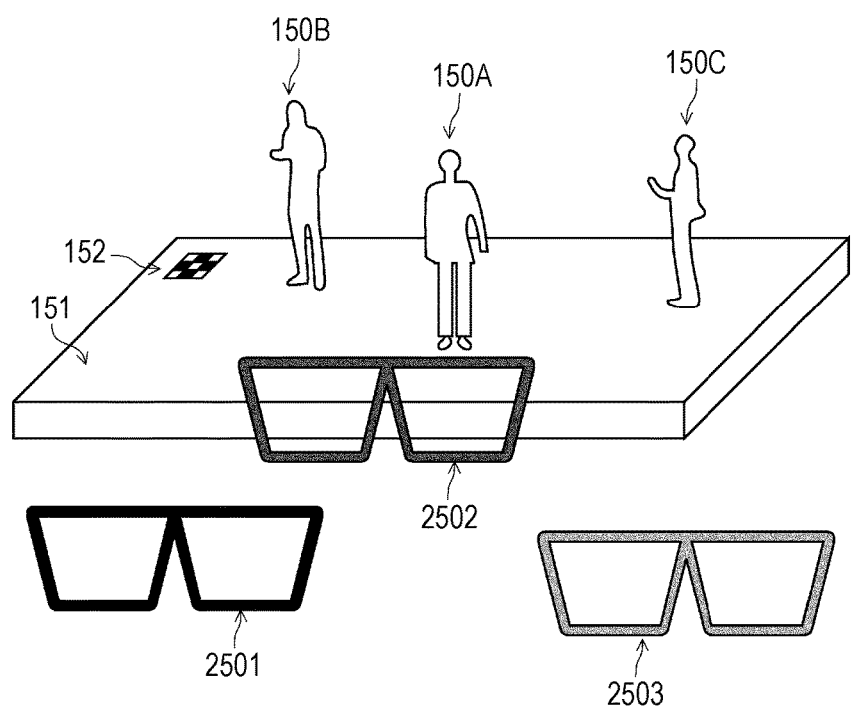
FIG. 25 is a diagram showing a situation where users are observing virtual objects 150A, 150B, 150C, . . . through head mount displays 2501, 2502, 2503, . . . , respectively.

As described above, user terminals can concurrently log in to the same server, and the virtual objects corresponding to the respective user terminals might appear on the same actual object at the same time. In such a case, the user terminals share a single output apparatus 403. When applied to the example illustrated in FIGS. 24A and 24B, this case is equivalent to a situation where users wearing head mount displays 2501, 2502, 2503, . . . are viewing the same actual object 151, as shown in FIG. 25. Virtual objects 150A, 150B, 150C, . . . that vary among the users are associated with the actual object 151 (or the identification information 152), and the respective users can observe the virtual objects 150A, 150B, 150C, . . . of the other users and his/her own through the head mount displays 2501, 2502, 2503, . . . . The respective virtual objects 150A, 150B, 150C, . . . perform interaction with the actual object 151, and the virtual objects 150A, 150B, 150C, . . . also perform interaction with one another.

In some embodiment, each of the users viewing the same actual object 151 through the head mount displays 2501, 2502, 2503, . . . might be able to observe only the virtual object of his/her own (that is, the virtual objects of the respective users appear at the same time, but each user cannot see the other users' virtual objects). In this case, each of the virtual objects performs interaction with the actual object 151, but the virtual objects do not perform interaction with one another.

Figure 7:
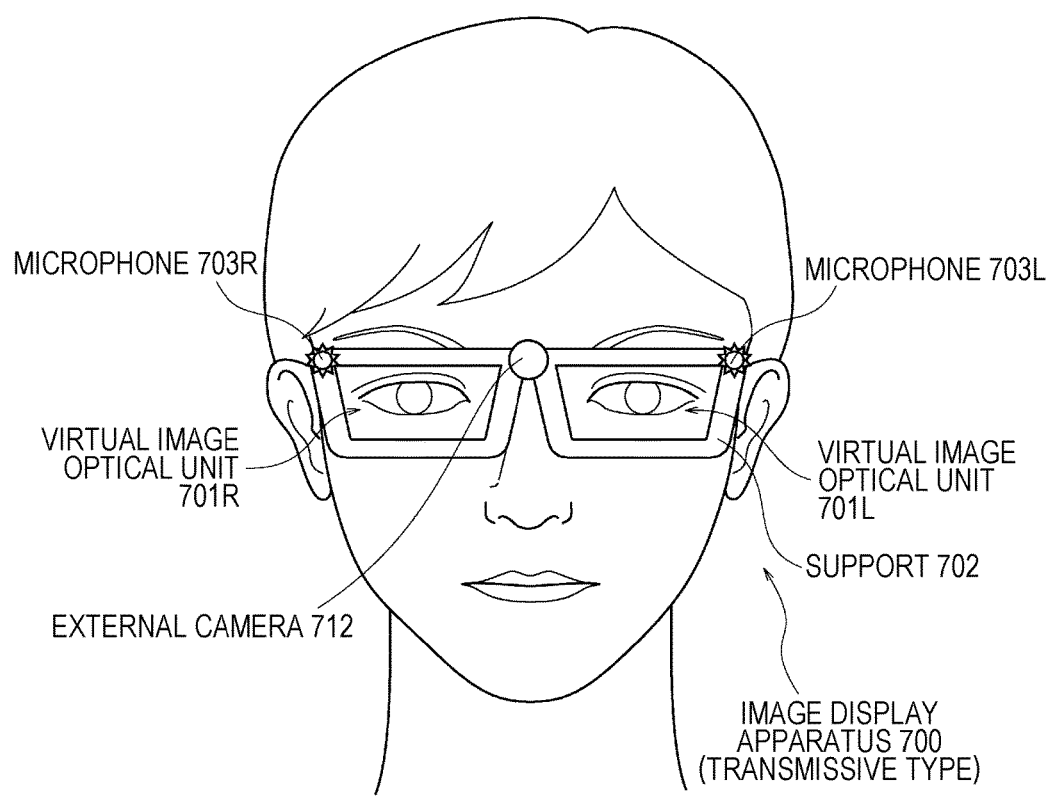
FIG. 7 is a diagram showing the external structure of an image display apparatus 700 that can be applied to the technology disclosed in this specification.

FIG. 7 shows the external structure of an image display apparatus 700 according to an embodiment of the technology disclosed in this specification. The image display apparatus 700 is a head mount display to be mounted on the head or a facial part of the user, and displays images for the right and left eyes. The image display apparatus 700 shown in the drawing is of a transmissive type or a see-through type, and a user can view a scenery in the real world through images (can "see through" images) while the images are being displayed. Accordingly, an AR (Augmented Reality) image such as a virtual object 150 overlapped on a scenery in the real world can be viewed. Displayed images cannot be seen from outside (or by others), and accordingly, privacy can be easily protected when information is displayed. This image display apparatus 700 can be used as the display apparatus 201 shown in FIG. 2, or the display apparatus 402 shown in FIG. 4, 5, or 29.

The image display apparatus 700 shown in the drawing has a similar structure to eyeglasses for vision correction. Virtual image optical units 701L and 701R formed with transparent light guiding units or the like are provided in the positions on the image display apparatus 700 that face the right and left eyes of a user, and images (not shown) to be observed by the user are displayed on the inner sides of the respective virtual image optical units 701L and 701R. The respective virtual image optical units 701L and 701R are supported by a support 702 that has a similar shape to a pair of eyeglass frames, for example.

At almost the center of the support 702 in the form of eyeglass frames, an external camera 712 for inputting a surroundings image (the user's field of view) is provided. The external camera 712 can capture a scenery existing in the direction of the user's line of sight, for example. The external camera 712 can be formed with cameras so that three-dimensional information about the surroundings image can be obtained using disparity information. Even in a case where only a single camera is provided, the camera takes images using SLAM (Simultaneous Locallization and Mapping) image recognition while being moved, disparity information is calculated from frame images taken at different times (see Patent Document 5, for example), and three-dimensional information about the surroundings image can be obtained. In this embodiment, the field of view of the user following the virtual object 150 with his/her eyes is captured with the external camera 712. In a basic operation of the image display apparatus 700, when an actual object 151 is captured with the external camera 712, the virtual object 150 corresponding to the actual object 151 is displayed on at least one of the virtual image optical units 701L and 701R.

Microphones 703L and 703R are also provided near the left and right ends of the support 702, respectively. With the microphones 703L and 703R almost symmetrically positioned in the right and left, it is possible to recognize only the sound (the user's voice) localized in the center, and separate the sound from ambient noise and voices of other people. For example, when an operation using voice inputs from the microphones 703L and 703R is performed, picking up voice of a person other than the user can be prevented.

Figure 8:
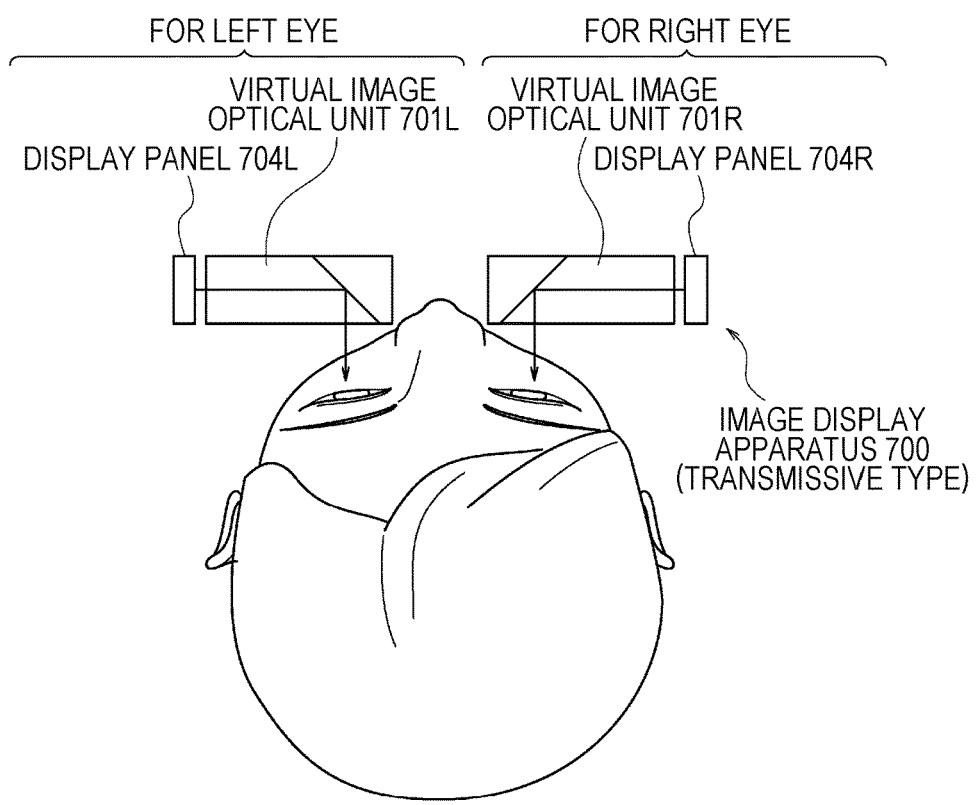
FIG. 8 is a diagram illustrating the image display apparatus 700 worn by a user, seen from above.

FIG. 8 shows the image display apparatus 700 worn by a user, seen from above. As shown in the drawing, display panels 704L and 704R that output and display an image for the left eye and an image for the right eye, respectively, are provided at the left and right ends of the image display apparatus 700. Each of the display panels 704L and 704R is formed with a microdisplay such as a liquid crystal display or an organic EL device, or a laser scanning display such as a retinal direct-drawing display. The left and right display images output from the display panels 704L and 704R are guided close to the left and right eyes by the virtual image optical units 701L and 701R, respectively, and enlarged virtual images are formed in the eyes of the user. Although not specifically shown in the drawing, each of the virtual image optical units 701L and 701R includes: an optical system that gathers irradiation light from a microdisplay; a light guide panel provided in the position that accepts light that has passed through the optical system; a polarizing filter that reflects the light that has entered the light guide panel; and a polarizing filter that emits the light having propagated in the light guide panel through total internal reflection toward an eye of the user.

In this embodiment, the display panels 704L and 704R are used to display the virtual object 150 as an AR image in a see-through manner. The image display apparatus 700 to be mounted on the head or a facial part of a user may display the virtual object 150 not in a see-through manner but in a video see-through manner.

Figure 9:
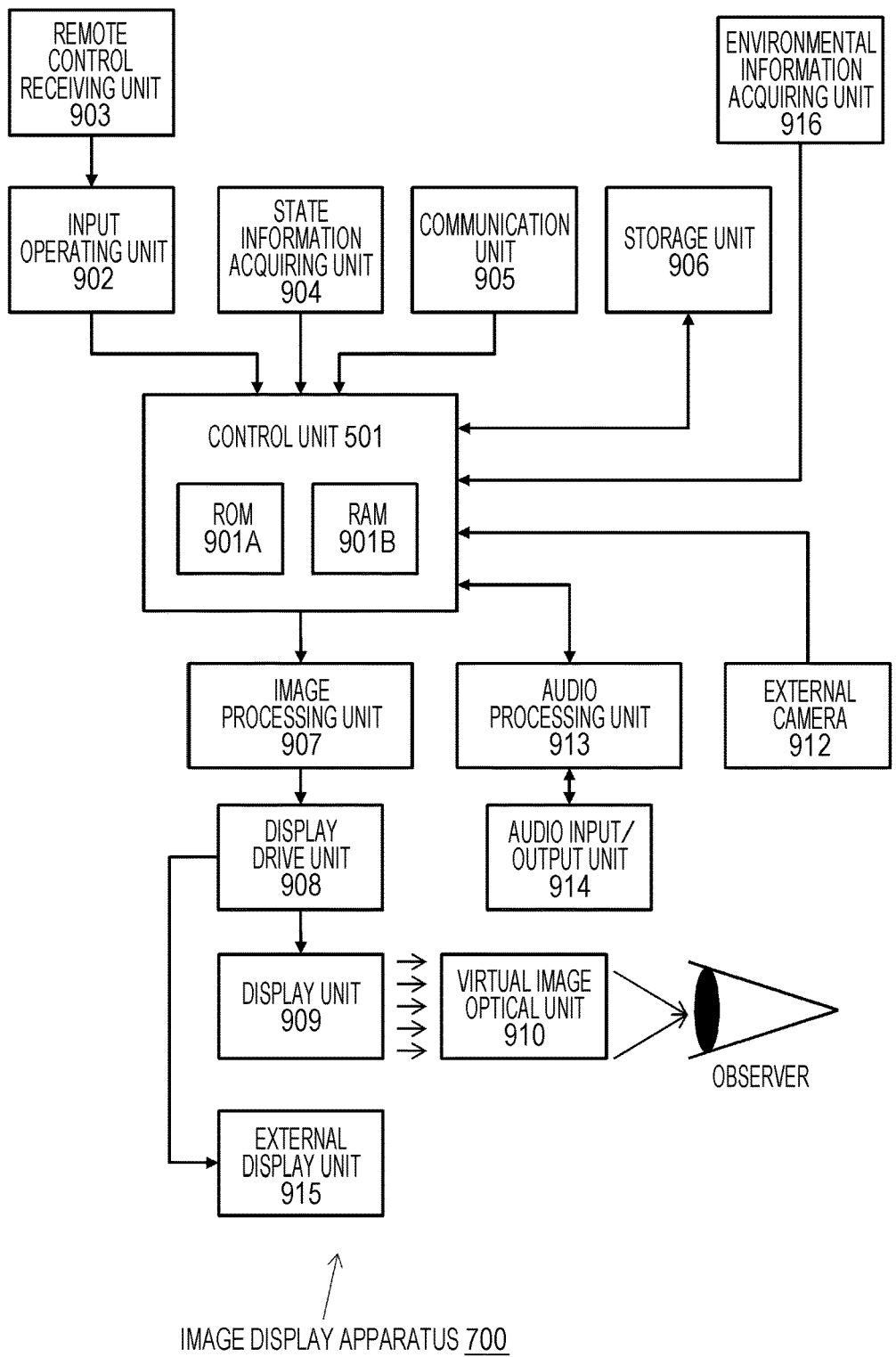
FIG. 9 is a diagram showing an example internal structure of the image display apparatus 700.

FIG. 9 shows an example internal structure of the image display apparatus 700. The following is a description of the respective components.

A control unit 901 includes a ROM (Read Only Memory) 901A and a RAM (Random Access Memory) 901B. The ROM 901A stores program codes to be executed by the control unit 901, and various kinds of data. By executing a program loaded into the RAM 901B, the control unit 901 starts image display control, and collectively controls operations of the entire image display apparatus 700.

Examples of programs and data stored in the ROM 901A include an image display control program, a control program for generating a virtual object 150 or controlling display of the virtual object 150, a detection program for detecting action a virtual object 150 performs in the real space (or for identifying the actual object 151 being physically operated by the virtual object 150 and detecting the action being performed on the actual object 151, for example), a program for communication with an external device such as a server (not shown) in the Internet, libraries of the virtual objects 150 corresponding to respective actual objects 151, and identification information 152 unique to the apparatus 700. However, the libraries of the virtual objects 150 may not locally stored in the image display apparatus 700 but may be acquired from a server (not shown) in the Internet one by one.

An input operating unit 902 includes one or more operation pieces with which the user performs an input operation, such as keys, buttons, or switches. The input operating unit 902 receives a user instruction via the operation pieces, and outputs the user instruction to the control unit 901. The input operating unit 902 also receives a user instruction formed with a remote control command received by a remote control receiving unit 903, and also outputs this user instruction to the control unit 901.

In this embodiment, the user might cause display of a virtual object 150 to appear or disappear, or perform action on a virtual object 150, through the input operating unit 902.

A state information acquiring unit 904 is a functional module that acquires state information about the image processing apparatus 700 or about the user wearing the apparatus 700. The state information acquiring unit 904 may be equipped with various sensors for detecting state information, or may acquire state information from an external device (such as a smartphone or a wristwatch the user is wearing, or some other multifunctional terminal) equipped with some or all of those sensors, via a communication unit 905 (described later).

So as to follow the movement of the head of the user, the state information acquiring unit 904 acquires information about the location of the head of the user and the posture of the user, or information about the posture of the user, for example. So as to follow the movement of the head of the user, the state information acquiring unit 904 is a sensor that can detect nine axes in total, including a triaxial gyro sensor, a triaxial acceleration sensor, and a triaxial geomagnetic sensor, for example. The state information acquiring unit 304 may further include a combination of one or more of the following sensors: a GPS (Global Positioning System) sensor, a Doppler sensor, an infrared sensor, a radio field intensity sensor, and the like. So as to acquire location and posture information, the state information acquiring unit 904 may also use a further combination of information provided from various kinds of infrastructures, such as cellular phone base station information and PlaceEngine (registered trademark) information (electrically-measured information from a wireless LAN access point). In the example illustrated in FIG. 9, the state acquiring unit 904 for following the movement of the head is included in the head mount display as the image display apparatus 700. However, the state information acquiring unit 904 may be formed with an accessory component or the like externally attached to the head mount display. In the latter case, the externally-connected state acquiring unit 904 expresses posture information about the head in the form of a rotation matrix, for example, and transmits the posture information to the head mount display by wireless communication such as Bluetooth (registered trademark) communication, or via a high-speed cable interface such as a USB (Universal Serial Bus).

Other than following the movement of the head of the user in the above described manner, the state information acquiring unit 904 also acquires state information about the user wearing the image display apparatus 700. Examples of the state information include the working state of the user (whether the user is wearing the image display apparatus 700), the state of action of the user (a transfer state such as a resting state, a walking state, or a running state, the opened/closed state of the eyelids, the direction of the line of sight, the size of the pupils, or physical action such as action or reaction to be performed on a virtual object 150), the mental state of the user (the level of sensation, excitement, consciousness, feeling, or emotion, such as whether the user is absorbed in or concentrates on observing a virtual object), and the physiological state of the user. So as to acquire such state information from the user, the state information acquiring unit 904 may include various kinds of state sensors such as an attachment sensor formed with a mechanical switch or the like, an internal camera that captures the face of the user, a gyro sensor, an acceleration sensor, a velocity sensor, a pressure sensor, a temperature sensor that senses body temperature or atmospheric temperature, a perspiration sensor, a myoelectric potential sensor, an ocular potential sensor, a brain-wave sensor, an inlet air sensor, and a gas/ion concentration sensor, as well as a timer (any of those sensors is not shown in the drawing).

In this embodiment, appearance and disappearance of display of a virtual object 150, operation of a virtual object 150, and action performed by an actual object 151 on a virtual object 150 might be controlled based on the state or a change in the state acquired by the state information acquiring unit 904.

An environmental information acquiring unit 916 is a functional module that acquires information about one or more environmental factors surrounding the image processing apparatus 700 or the user wearing the apparatus 700. Here, the environmental factors are electromagnetic waves (ultraviolet rays, blue light, radio waves), heat rays (infrared rays), radiation, hazardous chemical substances suspended in the air, noise, negative ions, and the like, to which the apparatus 700 or the user is exposed.

The environmental information acquiring unit 916 may include various kinds of sensors for detecting such environmental factors. Alternatively, the environmental information acquiring unit 916 may acquire information about environmental factors from an external device (such as a smartphone or a wristwatch the user is wearing, or some other multifunctional terminal) equipped with some or all of the sensors, or a server that collects environmental information, via the communication unit 905 (described later).

In this embodiment, appearance and disappearance of display of a virtual object 150, operation of a virtual object 150, and action performed by an actual object 151 on a virtual object 150 might be controlled based on the environments or a change in the environments acquired by the environmental information acquiring unit 916.

An external camera 912 is placed at almost the center of the front surface of the image display apparatus 700 (see the external camera 712 in FIG. 7), for example, and can take an image of the surroundings. Also, posture control in the panning, tilting, and rolling directions of the external camera 912 is performed in accordance with the direction of the user's line of sight detected by the state information acquiring unit 904, so that an image on the level of the user's line of sight, or an image of the direction of the user's line of sight, can be taken with the external camera 912. The external camera 912 can be formed with cameras so that three-dimensional information about the surroundings image can be obtained using disparity information. Even in a case where only a single camera is provided, the camera takes images using SLAM (Simultaneous Locallization and Mapping) image recognition while being moved, disparity information is calculated from frame images taken at different times (see Patent Document 5, for example), and three-dimensional information about the surroundings image can be obtained. The user can adjust the zoom factor of the external camera 912 through operation of the input operating unit 902, in accordance with the size of the pupils recognized by the internal cameras, or through a voice input. An image taken with the external camera 912 can be output to and displayed on a display unit 909, and can also be stored in a storage unit 906.

The field of view of the user following a virtual object 150 with his/her eyes can be captured with the external camera 912. Accordingly, the external camera 912 can also be used as the above described detecting unit 104 in this embodiment. For example, an actual object 151 can be identified by reading identification information 152 such as a bar code attached to the actual object 151 from an image taken with the external camera 912, or recognizing the object from an image taken with the external camera 912.

The communication unit 905 communicates with an external device such as another image display apparatus, a multifunctional terminal, or a server (not shown) in the Internet, and performs modulation and demodulation, and encoding and decoding on communication signals. The control unit 901 also sends data to be transmitted to an external device through the communication unit 905. The communication unit 905 can have any kind of structure. For example, the communication unit 905 can be designed in accordance with the communication method to be used in a transmitting/receiving operation with an external device with which communication is to be performed. The communication method may involve either cable communication or wireless communication. Here, the communication standards may be MHL (Mobile High-definition Link), USB (Universal Serial Bus), HDMI (registered trademark) (High Definition Multimedia Interface), Wi-Fi (registered trademark), Bluetooth (registered trademark) communication, BLE (Bluetooth (registered trademark) Low Energy) communication, ultra-low power consumption wireless communication such as ANT, a mesh network standardized by IEEE802.11s or the like, infrared communication, intrabody communication, or signal transmission via conductive fibers, for example.

Alternatively, the communication unit 905 may be a wireless cellular transceiver that operates in accordance with standards such as W-CDMA (Wideband Code Division Multiple Access) or LTE (Long Term Evolution).

In this embodiment, information about a virtual object 150 generated in the image display apparatus 700, and acquired state information and environmental information might be transmitted to an external device via the communication unit 905. Also, information (such as a library) that is generated in an external server and is designed for controlling display of a virtual object 150 might be received via the communication unit 905.

The storage unit 906 is a large-capacity storage that is formed with an SSD (Solid State Drive) or the like. The storage unit 906 stores application programs to be executed by the control unit 901, and various kinds of data. For example, information (such as a library) about a virtual object 150 subjected to display control by the control unit 901, a display image of a virtual object 150 displayed on the display unit 909 may be stored in the storage unit 906.

An image processing unit 907 further performs signal processing such as image quality correction on image signals to be output from the control unit 901, and converts the resolution of the image signals to a resolution compatible with the screen of the display unit 909. A display drive unit 908 sequentially selects the pixels of the display unit 909 row by row, and performs line sequential scanning on the pixels, to supply pixel signals based on the image signals subjected to the signal processing.

The display unit 909 includes a display panel that is formed with a microdisplay such as an organic EL (Electro-Luminescence) device or a liquid crystal display, or a laser scanning display such as a retinal direct-drawing display. A virtual image optical unit 910 enlarges the image displayed on the display unit 909, and projects the image as an enlarged virtual image for the user to see. In this embodiment, an AR image of a virtual object 150 or the like is presented to the user to see through the virtual image optical unit 910.

An external display unit 915 has a display screen facing the outside of the image display apparatus 700 (or facing the opposite direction from the face of the user wearing the image display apparatus 700), and can display the same image as or a different image from that displayed on the display unit 909, to the other users nearby. For example, if an image of a virtual object 150 displayed on the display unit 909 is also displayed on the external display unit 915, a feeling of virtual reality can be shared with the other users nearby. As for the details of the external display unit 915, see the specifications of Japanese Patent Application Nos. 2012-200902 and 2012-200903, which have already been assigned to the applicant.

An audio processing unit 913 performs sound quality correction or sound amplification on audio signals to be output from the control unit 901, and further performs signal processing on input audio signals or the like. An audio input/output unit 914 outputs sound subjected to audio processing to the outside, and inputs sound from a microphone (described above). In this embodiment, the audio input/output unit 914 can output a binaural sound source.

In the above description, a virtual object 150 appears in accordance with a user's viewing or finding of the actual object 151 in a basic operation. In a case where the display apparatus 201 or the display apparatus 402 is formed as a head mount display, the field of view of the user is captured with the external camera 912, and the identification information 152 is read by analyzing the image taken with the external camera 912, or the actual object 151 can be identified through object recognition. In accordance with a result of this, the virtual object 150 appears on the display unit 909.

Although FIGS. 7 through 9 show an example structure of the display apparatus 201 or the display apparatus 402 to be realized as a head mount display, the technology disclosed in this specification is not limited to that. For example, the display apparatus 201 or the display apparatus 402 can be formed with an information terminal such as a smartphone or a digital camera that displays an image taken with a camera in a see-through manner (see Patent Document 6, for example).

Figure 10:
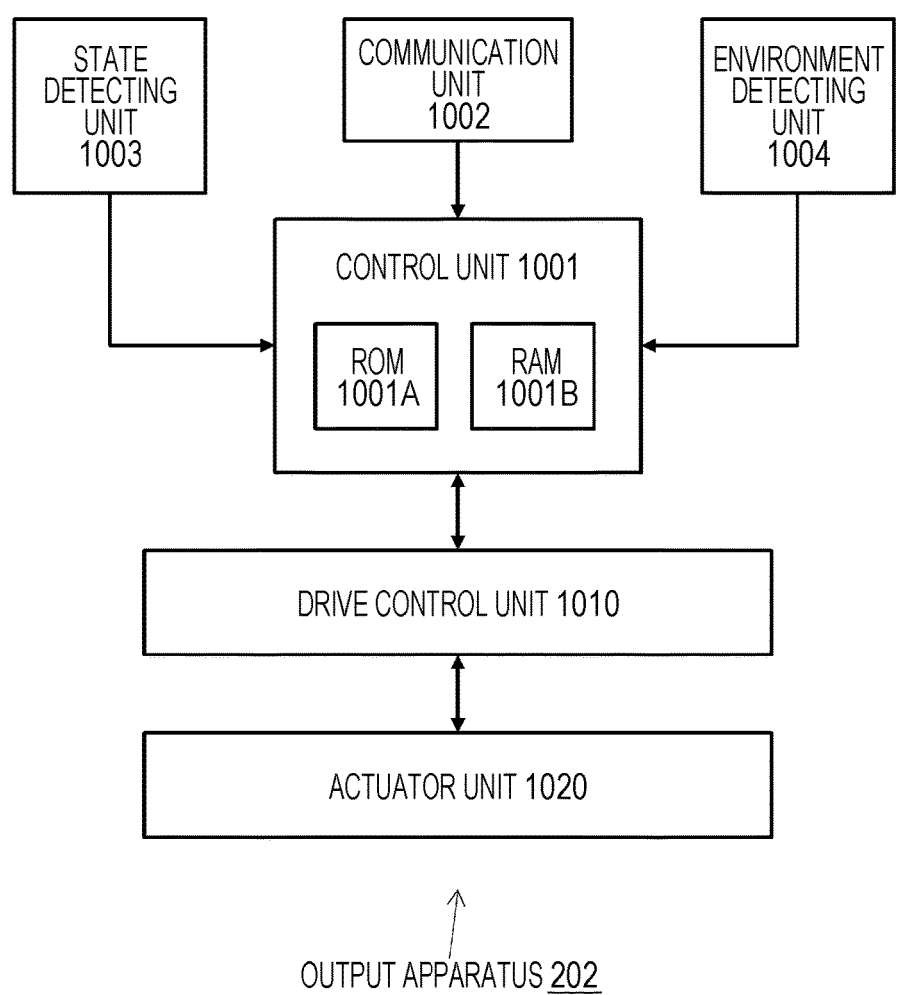
FIG. 10 is a diagram schematically showing an example internal structure of an output apparatus 202 formed as a special-purpose hardware apparatus.

FIG. 10 schematically shows an example internal structure of the output apparatus 202 or 403 formed as a special-purpose hardware apparatus. As described above, the output apparatus 202 is a hardware apparatus that expresses interaction a virtual object 150 has performed in the real space, and is formed integrally with or in an actual object 151, for example. The output apparatus 202 performs reaction to action of the virtual object 150, or performs action on the virtual object 150.

The output apparatus 202 shown in the drawing includes a control unit 1001, a communication unit 1002, a state detecting unit 1003, an environment detecting unit 1004, an actuator unit 1020, and a drive control unit 1010.

The control unit 1001 includes a ROM 1001A and a RAM 1001B. The ROM 901A stores program codes to be executed by the control unit 1001, and various kinds of data. By executing a program loaded into the RAM 1001B, the control unit 1001 controls operation of the actuator unit 1020 via the drive control unit 1010.

Programs stored in the ROM 1001A include a control program for controlling operation of the actuator unit 1020 so as to express reaction to action performed by the virtual object 150 on the actual object 151, action to be performed by the actual object 151 on the virtual object 150, or the like. Also, the data of an operation pattern of the actuator unit 1020 for expressing action or reaction to be performed on the virtual object 150 through the actual object 151 may be stored in the ROM 100A.

The state detecting unit 1003 detects the state or a change in the state of the actual object 151 on which the output apparatus 202 is mounted. The state detecting unit 1003 includes one or more state sensors such as a gyro sensor, an acceleration sensor, a velocity sensor, a pressure sensor, a temperature sensor that senses body temperature or atmospheric temperature, a perspiration sensor, a myoelectric potential sensor, an ocular potential sensor, a brain-wave sensor, an inlet air sensor, and a gas/ion concentration sensor.

The environment detecting unit 1004 detects one or more environmental factors or a change in the one or more environmental factors surrounding the actual object 151 on which the output apparatus 202 is mounted, or the virtual object 150 performing physical action on the actual object 151.

The actuator unit 1020 formed with one or more output devices for outputting reaction or action performed by the actual object 151 on the virtual object 150.

Figure 11:
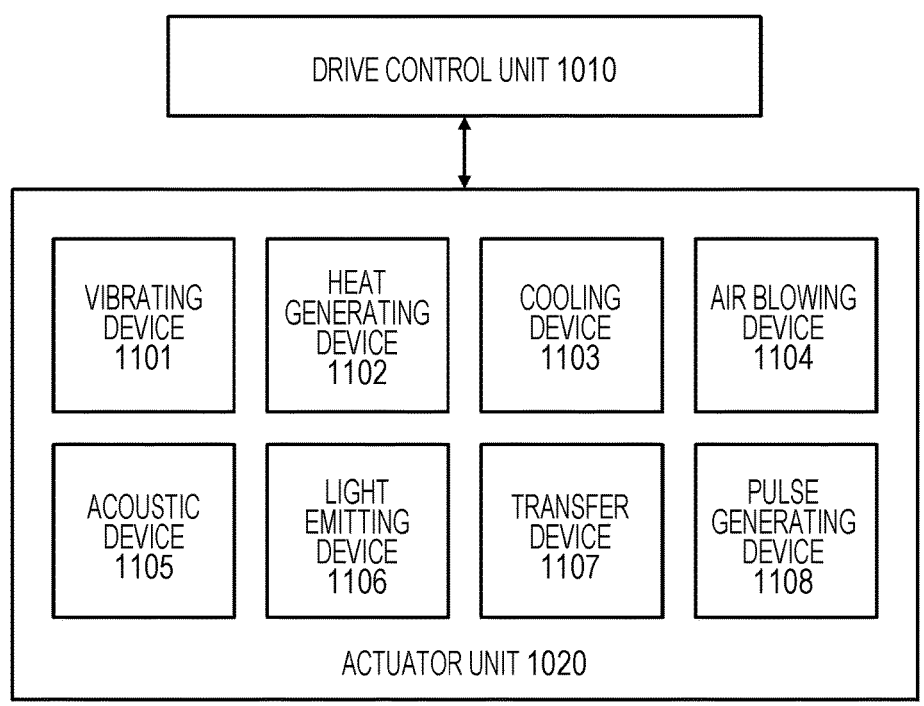
FIG. 11 is a diagram schematically showing an example structure of an actuator unit 1020.

FIG. 11 schematically shows an example structure of the actuator unit 1020. The actuator unit 1020 includes at least one of the output devices: a vibrating device 1101, a heat generating device 1102, a cooling device 1103, an air blowing device 1104 such as a fan, an acoustic device 1105 such as a speaker, a light emitting device 1106, a transfer device 1107 such as a wheel, and a pulse generating device 1108. The control unit 1001 can control operation of the output devices 1101 through 1108 via the drive control unit 1010. The actuator unit 1020 causes the actual object 151 on which the virtual object 150 performs action, to generate an output such as vibration, heat or cooling air, wind, sound, light, a transfer, or a jump as reaction or action to the virtual object 150. Where the number of types of output devices included in the actuator unit 1020 is large, and the output devices are operated in combinations, a wider variety of interaction can be presented.

Receiving a result of detection of action being performed by the virtual object 150 in the real space (detection of physical action being performed on the actual object 151, for example) from the display apparatus 201 or 402 via the communication unit 1002, the control unit 1001 calculates reaction to the action, and controls operation of the actuator unit 1020 via the drive control unit 1010. Also, receiving a result of calculation of reaction from the display apparatus 201 or 402 via the communication unit 1002, the control unit 1001 controls operation of the actuator unit 1020 in accordance with the result.

Receiving information about the state or a change in the state of the user, or information about the environments or a change in the environments surrounding the display apparatus 201 or 402 and the user from the display apparatus 201 or 402 via the communication unit 1002, the control unit 1001 calculates reaction or action of the actual object 151 in accordance with the state or the change in the state, or the environments or a change in the environments, and controls operation of the actuator unit 1020 via the drive control unit 1010. Also, receiving a result of calculation of reaction or action in accordance with the state or the environments from the display apparatus 201 or 402 via the communication unit 1002, the control unit 1001 controls operation of the actuator unit 1020 in accordance with the result.

It should be noted that the state of the user includes physical action such as action or reaction the user performs on the virtual object 150.

The control unit 1001 also calculates reaction or action in accordance with the state or a change in the state of the actual object 151 detected by the state detecting unit 1003, or the environmental factors or a change in the environmental factors surrounding the virtual object 150 detected by the state detecting unit 1004, and controls operation of the actuator unit 1020 in accordance with a result of the calculation.

The control unit 1001 may supply feedback of action or reaction of the actual object 151 performed with the actuator unit 1020, to the display apparatus 201 or 402 via the communication unit 1002.

The output apparatus 202 or the actual object 151 on which the output apparatus 202 is mounted has any shape and size (hereinafter, the output apparatus 202 and the actual object 151 on which the output apparatus 202 is mounted will be collectively referred to as the "output apparatus 202").

Figure 12A:
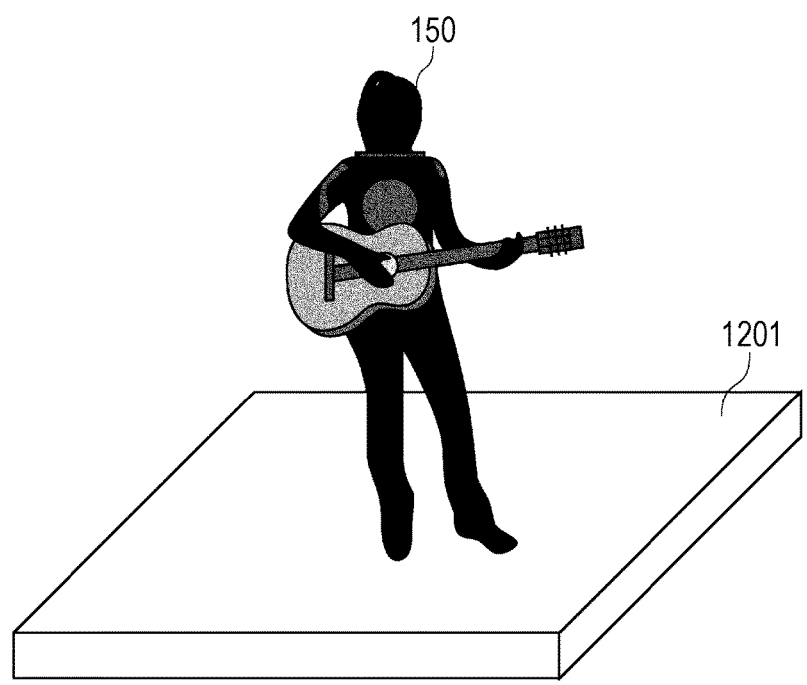
FIG. 12A is a diagram showing a specific example of the output apparatus 202.
Figure 12B:
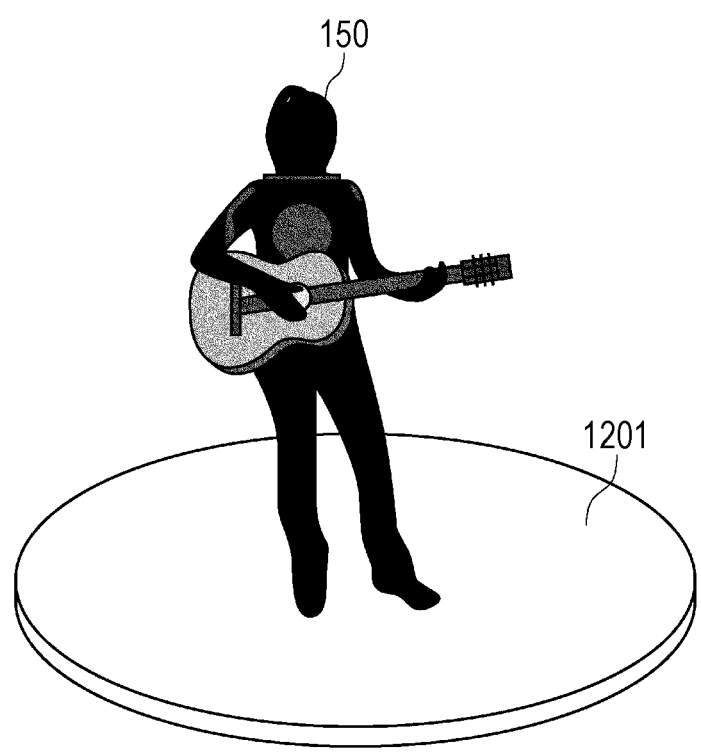
FIG. 12B is a diagram showing a specific example of the output apparatus 202.

In a case where a virtual object 150 in the shape of a human such as an avatar performs physical action such as walking up on the output apparatus 202 and stomping its feet thereon, for example, the output apparatus 202 may have a flat plate-like shape like a seat cushion as shown in FIG. 12A, or may have a disk-like shape as shown in FIG. 12B.

Also, the appropriate size for the output apparatus 202 varies with the size of the virtual object 150 that performs action or receives reaction. For example, in a case where the virtual object 150 is the size of a palm, the output apparatus 202 may also be the size of a palm as shown in FIG. 12C.

Figure 12C:
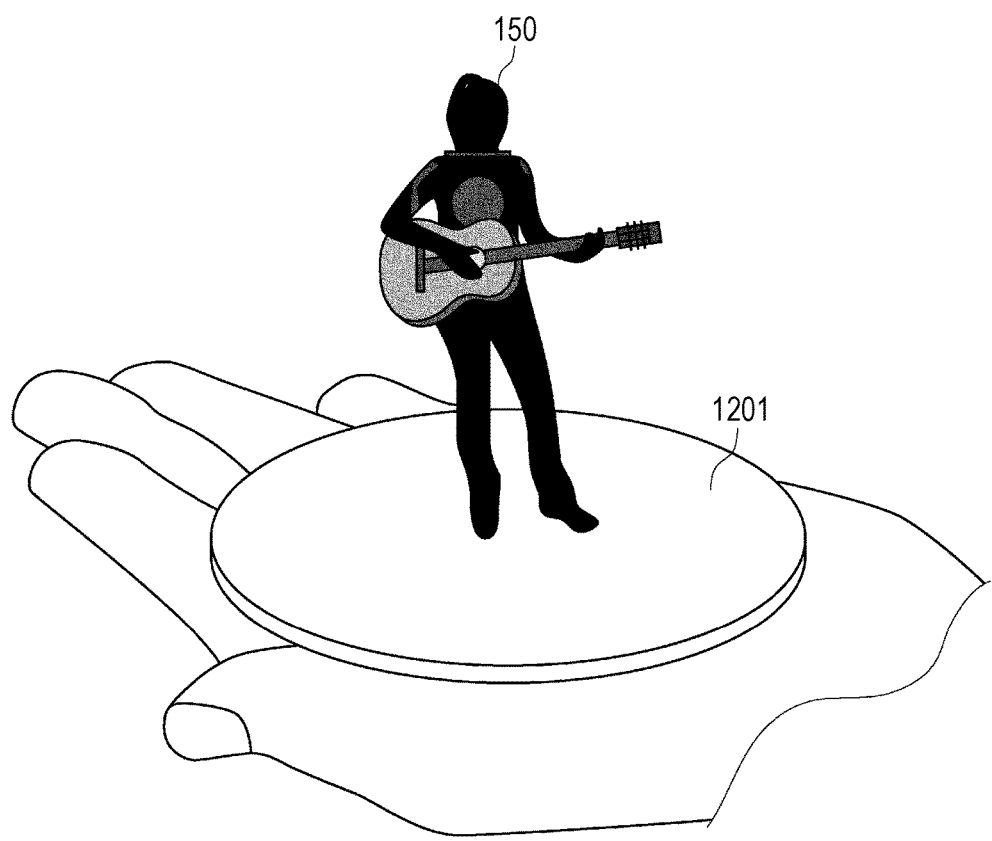
FIG. 12C is a diagram showing a specific example of the output apparatus 202.

Of each of the output apparatuses 202 shown in FIGS. 12A through 12C, the upper surface is an operation surface 1201 on which physical action (action to be performed by the virtual object 150, and reaction to be performed by the output apparatus 202 on the virtual object 150) is performed. The virtual object 150 does various kinds of activities such as walking up on the operation surface 1201, and walking, running, jumping, and playing a musical instrument on the operation surface 1201.

Although only one virtual object 150 appears on the single output apparatus 202 (actual object 151) in each of the examples shown in FIGS. 12A through 12C, two or more virtual objects may appear at the same time and coexist as shown in FIG. 25. For example, one of the virtual objects is the avatar of the user or a character in the game being played by the user, and the other virtual objects are the avatars of other users or other characters in the game.

In each of the system configurations shown in FIGS. 1, 2, 4, and 5, the actual object 151 includes the output unit 105 or is integrally formed with the output unit 105, and can perform reaction to action of the virtual object 150 appearing on the actual object 151, or perform action on the virtual object 150. In the simplest system configuration, however, the actual object 151 does not include the output unit 105, and is provided only with the identification information 152 so that object recognition can be performed. Such an actual object 151 is merely a stage on which the virtual object 150 appears, and does not perform any interaction.

Figure 26:
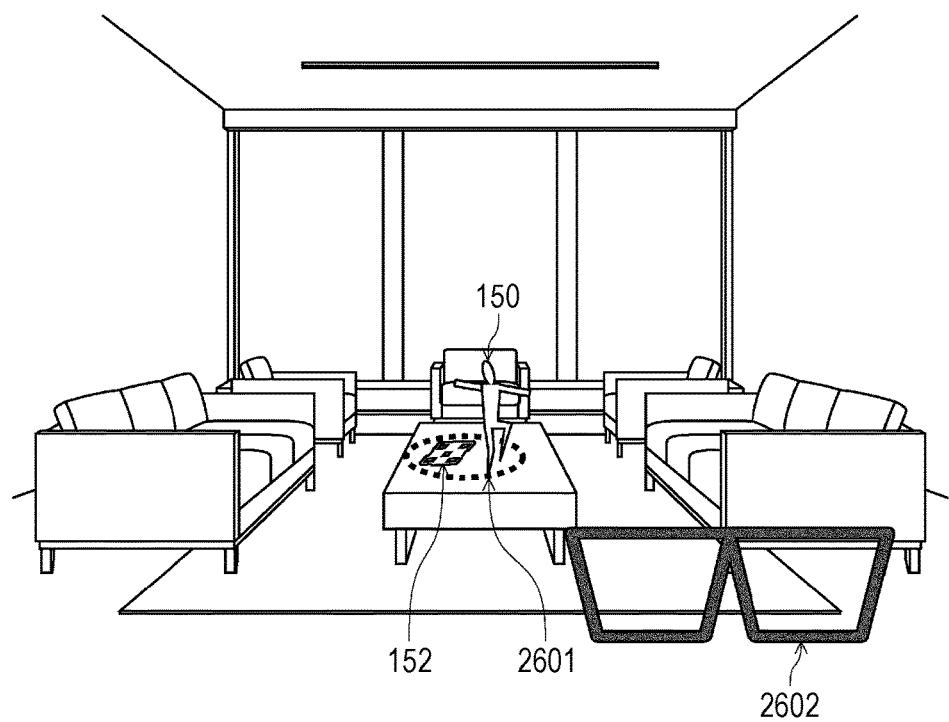
FIG. 26 is a diagram showing an example case where an area provided with identification information 152 in a room serves as an actual object.

Alternatively, the actual object 151 may be an area 2601 that is provided with the identification information 152 and is located in a room as shown in FIG. 26, or may be a place that can be identified through image recognition of the like. When the user sees the identification information 152 through a head mount display 2602, the virtual object 150 is displayed and overlapped on the area 2601. The place provided with the identification information 152 is merely the anchor for calling up the virtual object 150, and any physical action on the virtual object 150 (interaction with the virtual object 150) is not performed therein.

Figure 27:
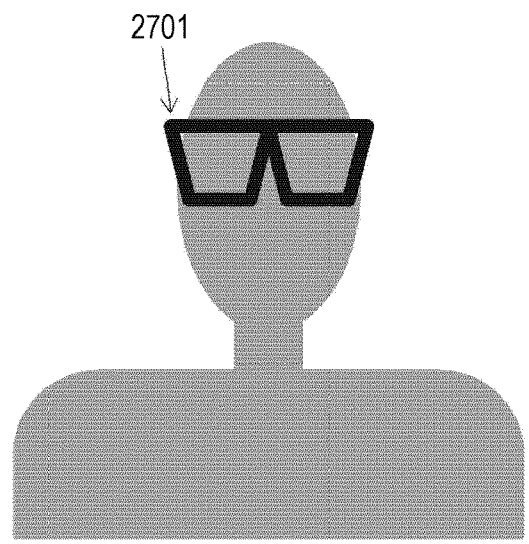
FIG. 27 is a diagram showing an example case where part of the body of a user serves as an actual object.
Figure 27:
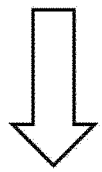
Figure 27:
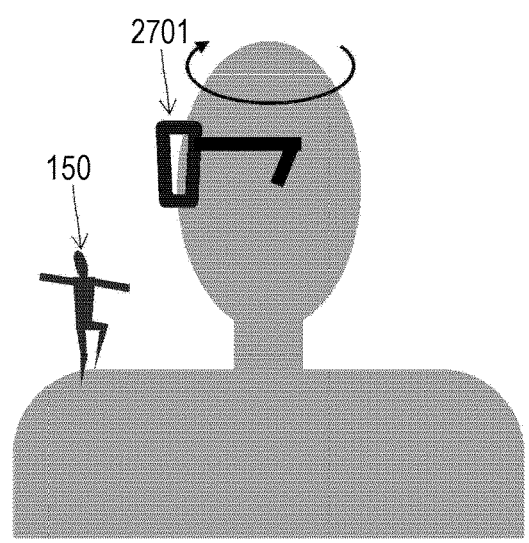

The actual object 151 may also be part of the body of the user, such as a palm or the right shoulder of the user. As shown in FIG. 27, the user wearing a head mount display 2701 looks to the right and gazes at the right shoulder. The user's looking to the right can be detected through a recognition process performed on an image taken with the external camera 912, for example, or based on a sensor output from a gyro sensor or the like. The head mount display 2701 then displays the virtual object 150 so that the virtual object 150 stands directly on the right shoulder of the user. The appearance method by which the user looks to the right when wishing to display the virtual object 150 (or when wishing to talk with the virtual object 150) is equivalent to the PULL type (described above).

For example, a binaural sound source or the like is used to generate the voice to be emitted from the virtual object 150 around the right shoulder of the user. As the user looks to the right, the virtual object 150 is displayed in return. It is natural interaction that the virtual object 150 is always talking from a fixed direction such as from the right shoulder. The appearance method by which the virtual object 150 spontaneously talks to the user when wishing to appear is classified as the PUSH type (described above). When the user looks away from the right shoulder and takes his/her eyes off the virtual object 150 on the right shoulder, the display of the virtual object 150 is made to disappear.

To detect the user's looking at the right shoulder, it is necessary to determine whether the user has looked to the right by changing his/her posture in the torso, and whether the user has simply moved his/her head while maintaining the same posture in the torso.

Figure 28:
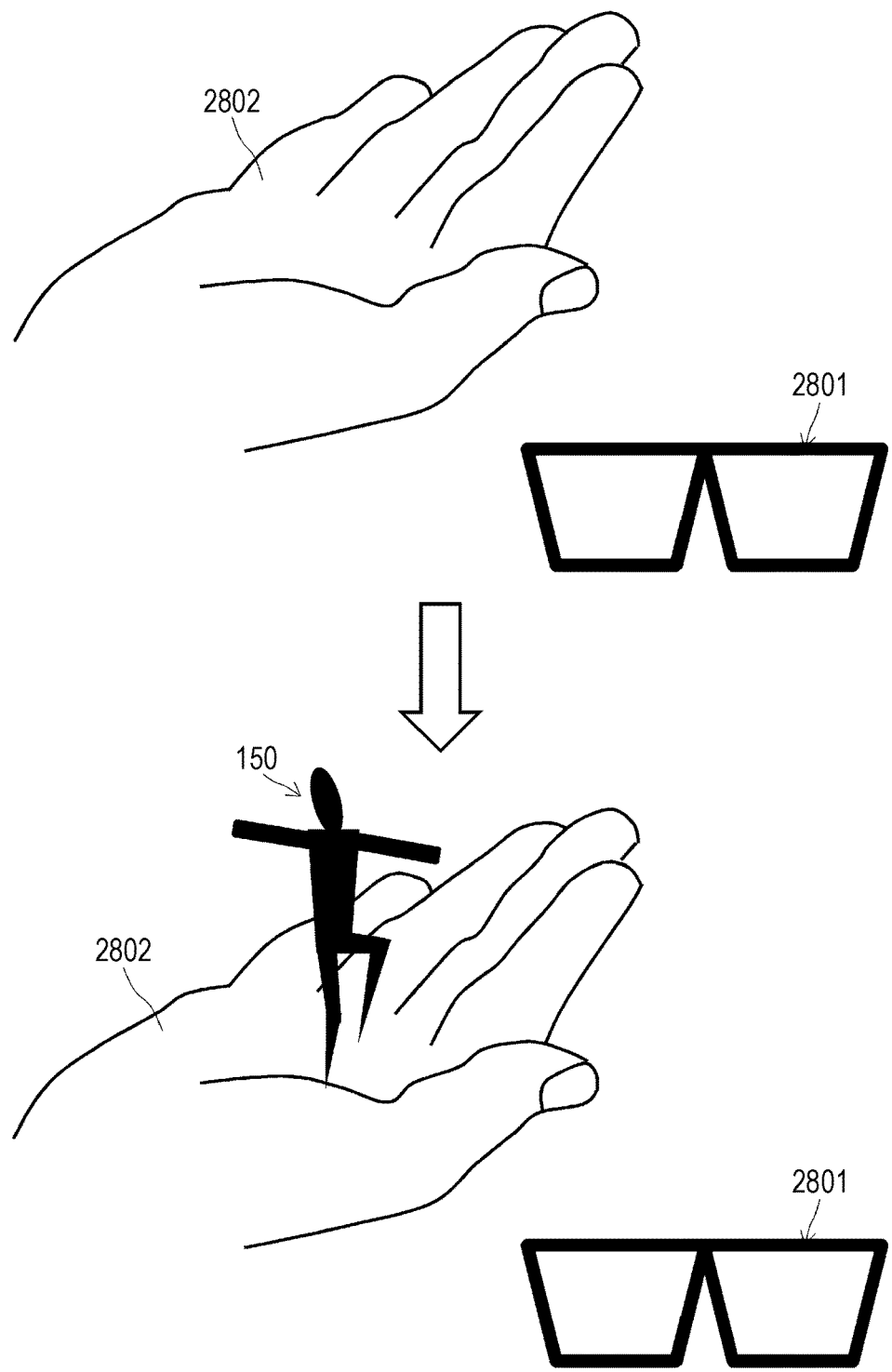
FIG. 28 is a diagram showing an example case where part of the body of a user serves as an actual object.

As shown in FIG. 28, when the user wearing a head mount display 2801 on the head is gazing at his/her palm 2802, and the user's gazing at the palm 2802 is detected, the head mount display 2801 displays the virtual object 150 so that the virtual object 150 stands directly on the palm 2802 of the user. At this point, whether the palm the user is gazing at is his/her own palm may be determined through authentication of a finger print captured with the external camera 912, for example. Instead of the personal authentication performed by determining whether the palm is the user's palm, it is possible to use a not-so-strict method by which the virtual object 150 is displayed when the palm is determined to be a right palm or not to be a left palm, or the virtual object 150 is displayed when a palm having a certain posture is detected. A palm can be determined through machine learning. Display of the virtual object 150 may be made to disappear when the user withdraw the palm or makes a fist.

In a case where the actual object 151 is formed with part of a human body such as the right shoulder or a palm as shown in FIGS. 27 and 28, action on the virtual object 150 can be performed not by driving a hardware device such as the actuator unit 1020, but by making a human motion such as moving the right shoulder up and down, shaking the right shoulder, moving a palm up and down, or making a fist. Action performed by the user on the virtual object 150 based on an image taken with the external camera 912 can be detected based on an image taken with the external camera 912, for example. In accordance with the detected action on the virtual object 150, the virtual object control unit 101 controls reaction of the virtual object 150, such as stepping or jumping on the right shoulder or a palm, or rolling off the right shoulder or a palm.

Next, reaction or action to be performed on the virtual object 150 with the use of the output apparatus 202 is described.

Figure 13:
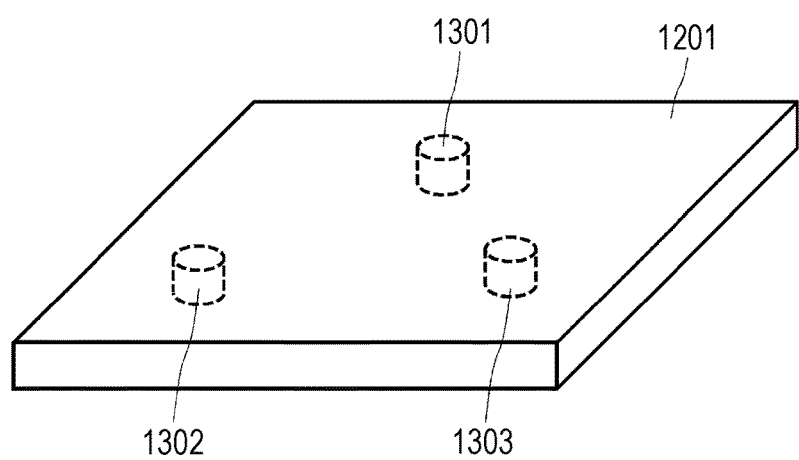
FIG. 13 is a diagram showing an example structure of a vibrating device 1101.
Figure 14:
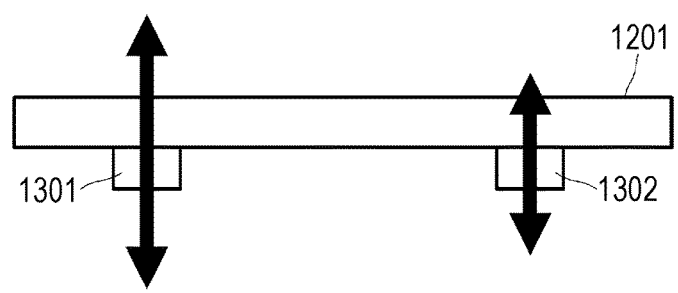
FIG. 14 is a diagram showing an example operation of the vibrating device 1101 shown in FIG. 13.
Figure 14:
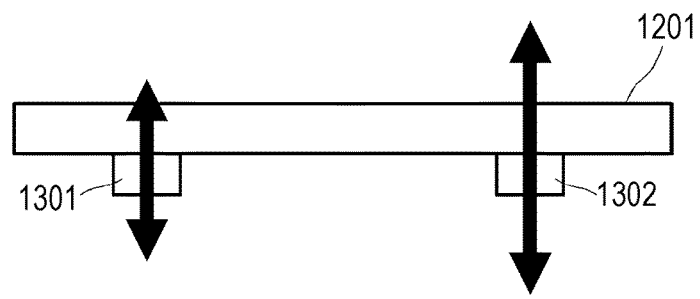

The vibrating device 1101 is formed with one or more devices that convert an electric signal into force or mechanical strain, such as piezoelectric devices. In an example illustrated in FIG. 13, the operation surface 1201 of the output apparatus 202 is supported by three or more piezoelectric devices 1301, 1302, and 1303. The piezoelectric devices 1301, 1302, and 1303 are operated so as to move in different strokes from one another as shown in FIG. 14. As a result, the operation surface 1201 can express a free space as shown in FIG. 15.

Figure 15:
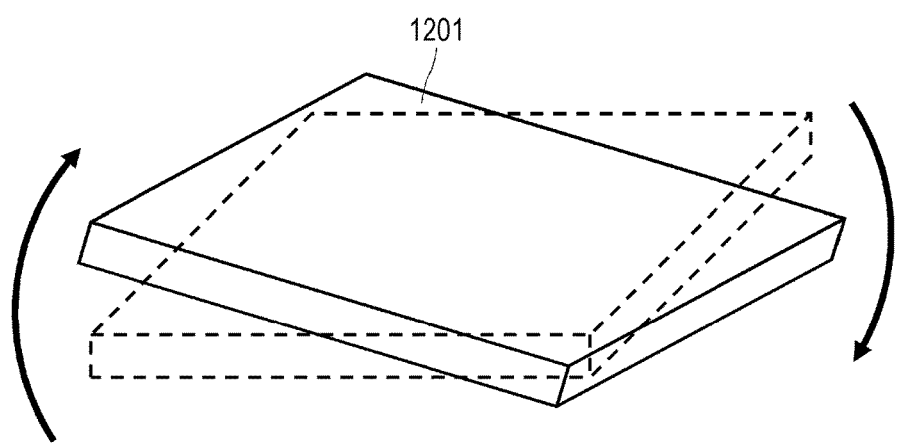
FIG. 15 is a diagram showing an example operation of the vibrating device 1101 shown in FIG. 13.

The operation shown in FIG. 15 can give action, which is a sloping floor, to the virtual object 150 standing on the operation surface 1201. In turn, the walking-type virtual object 150 needs to make a move, such as tilting its body forward, changing the positions of the feet, or jumping. Otherwise, the virtual object 150 will roll off the operation surface 1201.

Based on a result of recognition of an image taken with the external camera 912 or the like, the detecting unit 104 detects the action performed by the output apparatus 202 (the actual object 151) on the virtual object 150, as the operation surface 120 of the actual object 151 is sloping. Alternatively, the detecting unit 104 receives, from the output control unit 106, a notification that the actuator unit 1020 is to be operated to slope the operation surface 120.

The detecting unit 104 then notifies the virtual object control unit 101 of the action the output apparatus 202 has performed on the virtual object 150. In turn, the virtual object control unit 101 controls reaction of the virtual object 150, such as moving or changing its posture so as not to roll off the floor, or rolling off the floor without changing the posture or the like. The display unit 103 then displays the virtual object 150 that is reacting.

In a case where the output apparatus 202 is put on a part of the user's body such as a palm as shown in FIG. 12C, operation of the actuator unit 1020 serves not only as action on the virtual object 150 but also as tactile feedback to the user.

Figure 16:
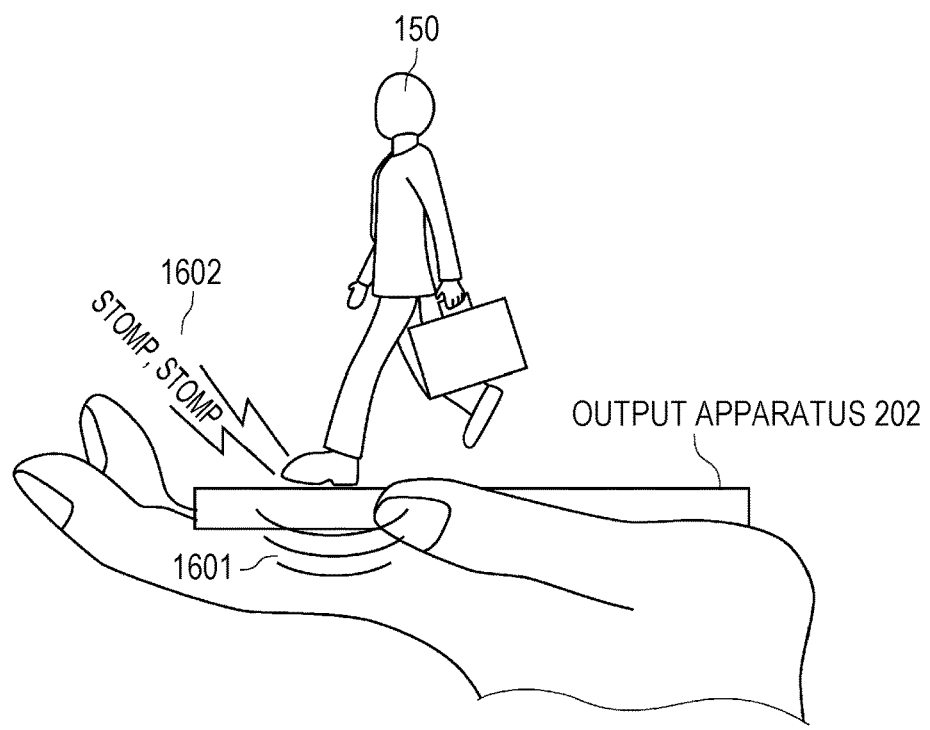
FIG. 16 is a diagram showing an example operation of the output apparatus 202 shown in FIG. 12C.

As shown in FIG. 16, when the virtual object 150 like an avatar stomps its feet on the output apparatus 202 (the actual object 151) placed on a palm of the user, the vibrating device 1101 vibrates to transmit a tactile sensation 1601 of feet stomping from the lower surface of the output apparatus 202 (the actual object 151) to the palm, for example. At the same time, the acoustic device 1105 may generate a stomping sound (an imitative sound such as "stomp, stomp") 1602, to increase the feeling of reality. Also, the heat generating device 1106 may generate heat, to express the physical action from the virtual object 150 in temperature. If the virtual object 150 being displayed is made to constantly move or continue to stomping its feet, for example, the user can get the impression that the virtual object 150 is performing interaction without delay.

Figure 17:
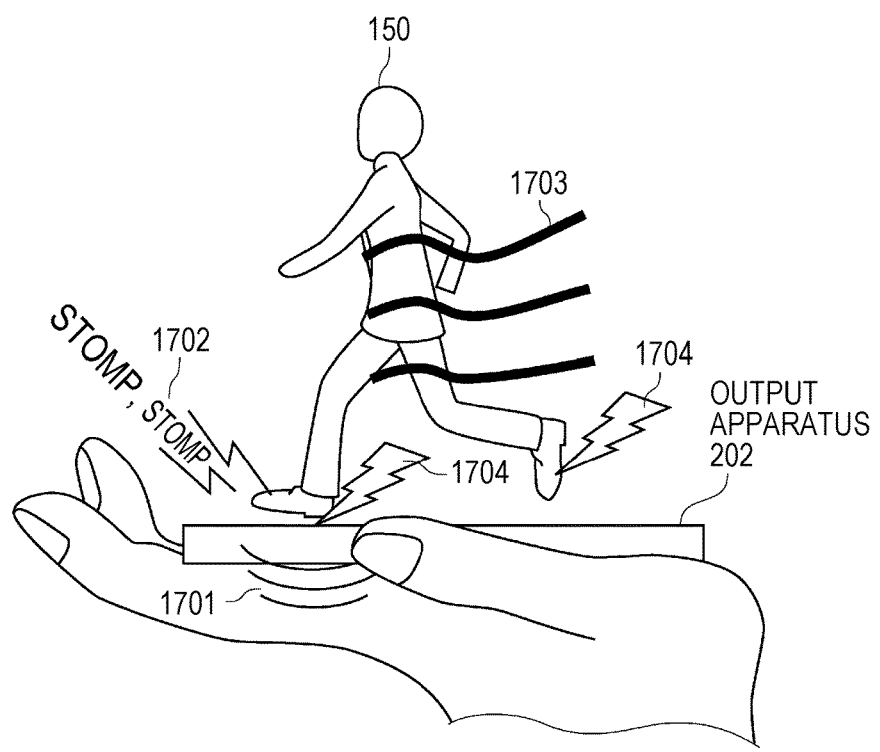
FIG. 17 is a diagram showing an example operation of the output apparatus 202 shown in FIG. 12C.

As shown in FIG. 17, when the virtual object 150 runs fast on the output apparatus 202 (the actual object 151), the above described vibrating device 1101 generates vibration 1701, and the acoustic device 1105 generates a loud stomping sound 1702. Further, the air blowing device 1104 may generate a wind 1703, the heat generating device 1102 may generate heat, and the light emitting device 1106 may generate flashlight 1704, to create the feeling that the virtual object 150 is actually running past. If the virtual object 150 being displayed is made to constantly move or continue to stomping its feet, for example, the user can get the impression that the virtual object 150 is performing interaction without delay.

Figure 18:
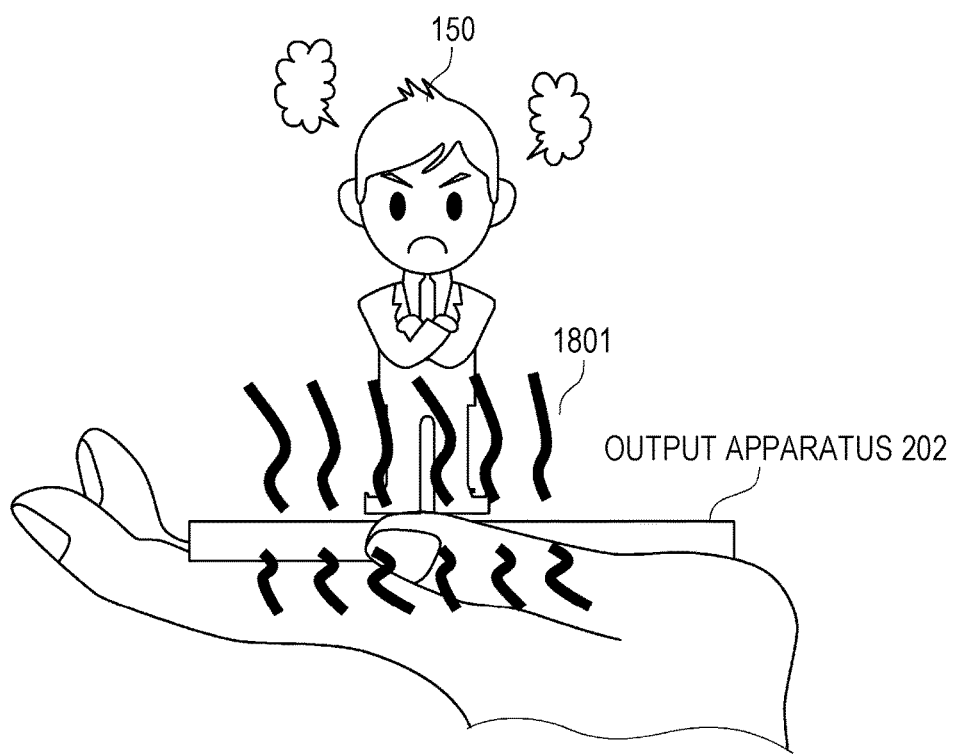
FIG. 18 is a diagram showing an example operation of the output apparatus 202 shown in FIG. 12C.
Figure 19:
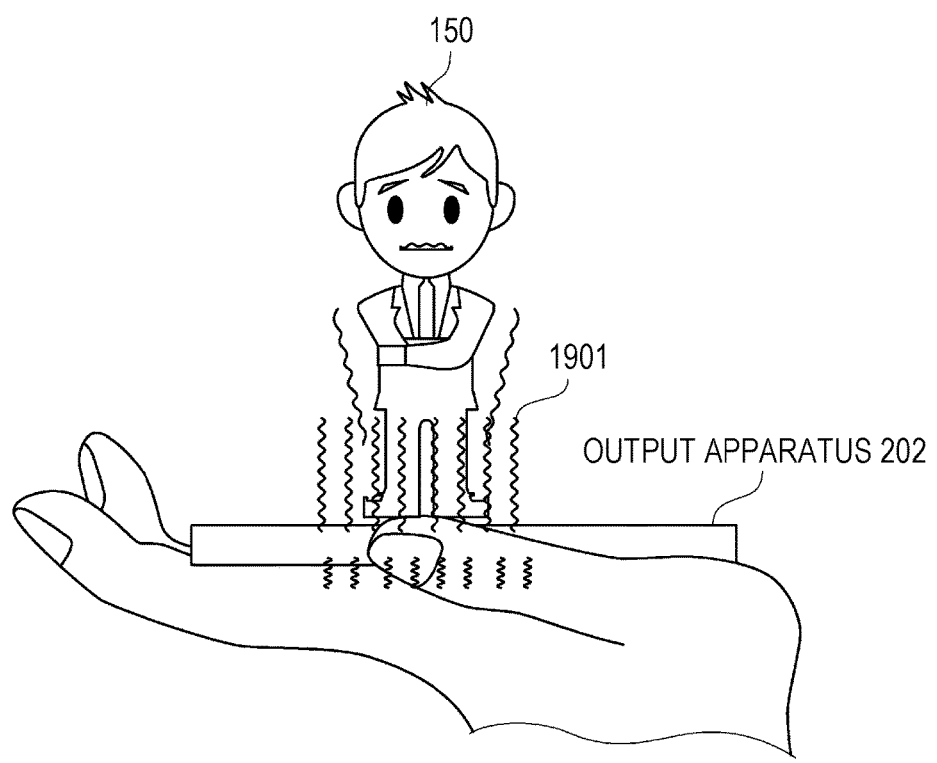
FIG. 19 is a diagram showing an example operation of the output apparatus 202 shown in FIG. 12C.

Using the heat generating device 1102 and the cooling device 1103, the output apparatus 202 can transmit the mental state of the virtual object 150 to the palm of the user in the form of temperature. For example, when the virtual object 150 is excited (or angry), the heat generating device 1102 generates heat, so that the excited state of the virtual object 150 can be transmitted in the form of hot air 1801 from the palm to the user (see FIG. 18). When the virtual object 150 is scared (or calm), the cooling device 1103 cools the palm of the user, so that the cooled (shivering) state of the virtual object 150 can be transmitted in the form of cold air 1901 from the palm to the user (see FIG. 19).

Figure 20:
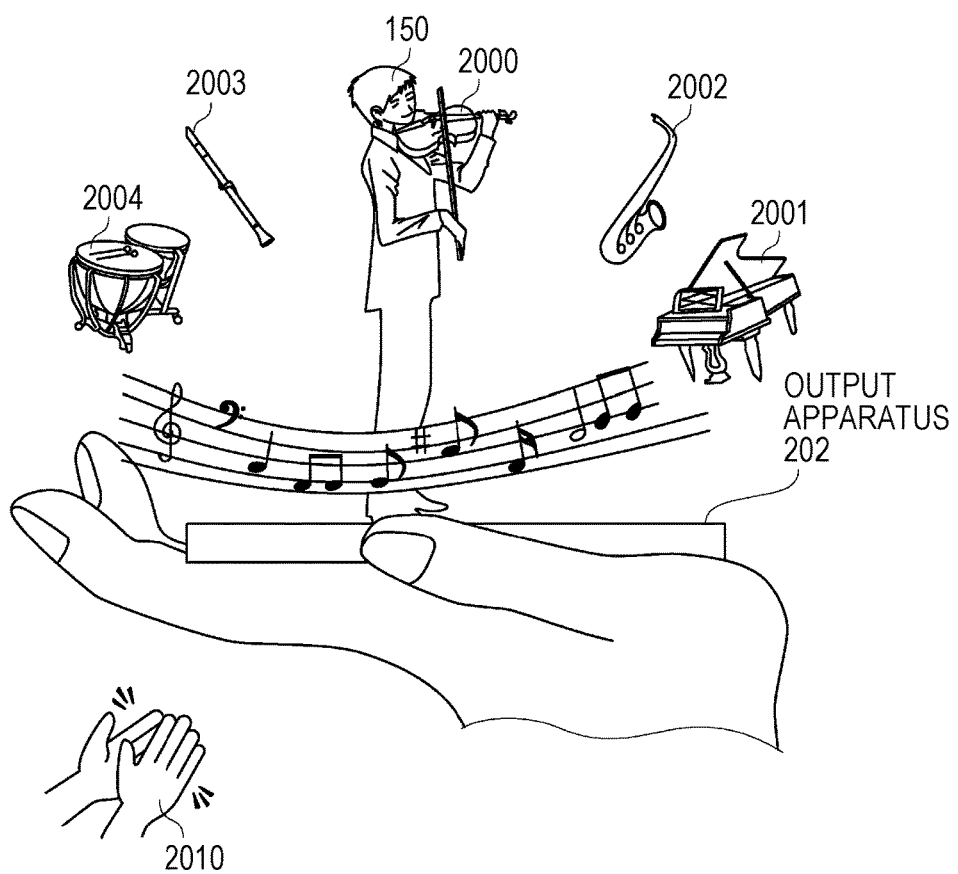
FIG. 20 is a diagram showing an example operation of the output apparatus 202 shown in FIG. 12C.

Using the acoustic device 1105, the output apparatus 202 can also add a sound effect to action or reaction being performed by the virtual object 150, and can create a feeling of reality. For example, when the virtual object 150 is playing a musical instrument such as violin 2000, the acoustic device 1105 can generate sounds of other musical instruments 2001, 2002, . . . , to increase the effect of the performance (see FIG. 20). Also, with the state information acquiring unit 904, the acoustic device 1105 can emit a sound of applause 2010 when the user is impressed by the performance of the virtual object 150. In this manner, it is possible to further enhance the mood.

FIGS. 10 and 11 show example structures of the high-specification output apparatus 202 including the output devices 1101, 1102, . . . . Where the actuator unit 1020 includes various kinds of output devices, action and reaction of the virtual object 150 in the real space can be expressed in a wider variety of forms, as can be seen from FIGS. 16 through 20. However, an information terminal including only a limited number of output devices can also serve as the output apparatus 202. For example, an information processing apparatus that has a vibrator function such as an eccentric motor, is flat in shape, and is the size of a palm (see Patent Document 7, for example), such as a smartphone, can also serve as the output apparatus 202 according to this embodiment.

A virtual object 150 acts unnaturally unless in synchronization with action and reaction being performed by the output apparatus 403. In a case where the display apparatus 402 is formed as a head mount display, when the user moves his/her head, the display area of the virtual object 150 is moved so as to offset the movement of the head detected by a gyro sensor or the like. In this manner, a virtual object 150 that follows the movement of the head of the user can be presented.

Figure 21:
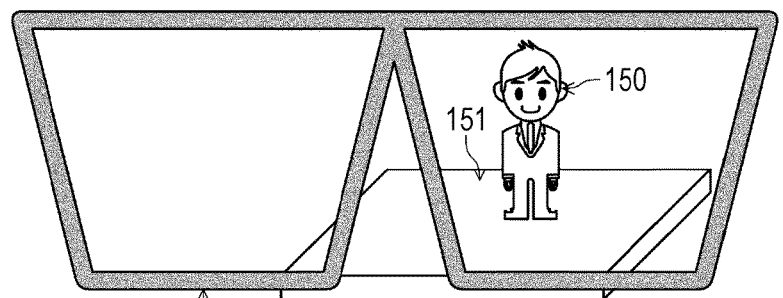
FIG. 21 is a diagram showing a situation where a virtual object 150 following the movement of the head of a user is presented.
Figure 21:
Figure 21:
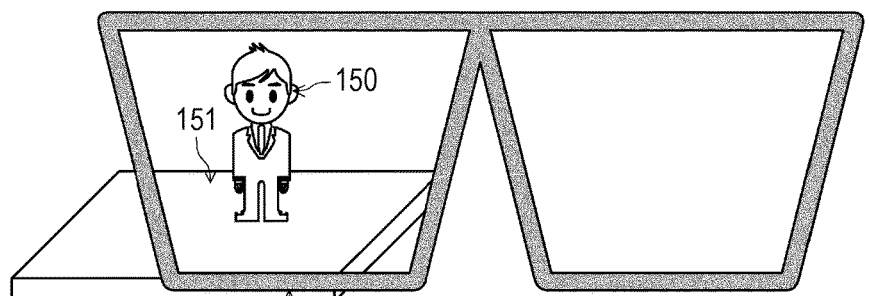
Figure 22:
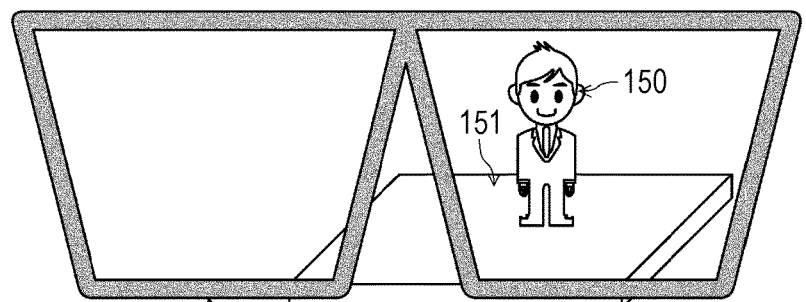
FIG. 22 is a diagram showing a situation where a virtual object 150 not following the movement of the head of a user is presented.
Figure 22:
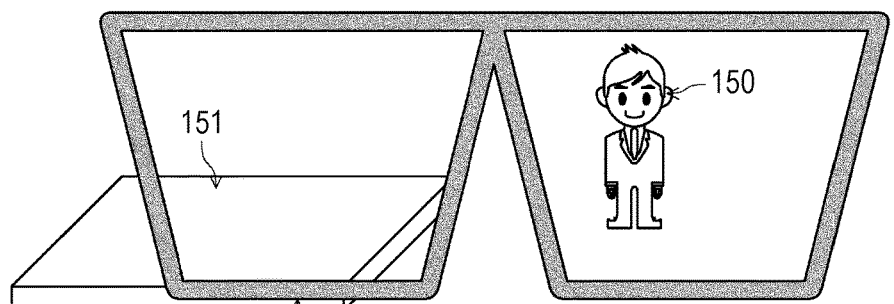

As shown in FIG. 21, when the user looks to the right, the field of view being seen through a head mount display 2101 moves to the right, and the display area of the virtual object 150 is moved in the opposite direction or to the left. As a result, the virtual object 150 remains on the actual object 151 on which the virtual object 150 appeared in the first place. Accordingly, it seems to the user as if the virtual object 150 existed in the real space. On the other hand, if the display area of the virtual object 150 does not follow the movement of the head of the user or the movement of the field of view of the user (or if the virtual object 150 is not returned to the original spot on the actual object 151), the virtual object 150 gives a strong impression of being an image displayed on the head mount display 2101, and does not look as if existing in the real space, as shown in FIG. 22.

Even if image correction is performed to move the display area of the virtual object 150 so as to offset the movement of the head of the user in this case, there is the problem of latency. As long as the display area of the virtual object 150 cannot change in synchronization with the movement of the head of the user due to latency, the display becomes unnatural. For example, when the movement of the head of the user wearing the head mount display is detected through image recognition performed on an image taken with the external camera 912, the correct value is detected only after a certain amount of time. Moreover, in a case where the control apparatus 401 that controls the virtual object 150 and the display apparatus 402 that displays the virtual object 150 are formed with apparatuses physically independent of each other as shown in FIGS. 4, 5, and 29, there is also the delay caused by a communication process, and therefore, the problem of latency becomes more serious.

Figure 23:
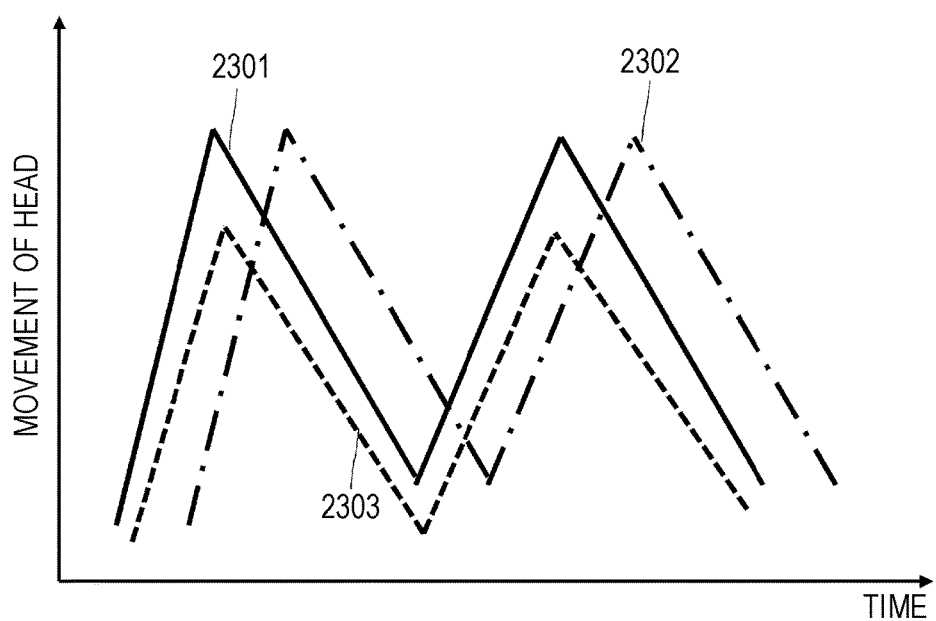
FIG. 23 is a diagram showing delay in the movement of an image of a virtual object 150 with respect to the movement of the head of a user.

FIG. 23 illustrates delay in the movement of an image of the virtual object 150 with respect to the movement of the head of the user. In the drawing, the actual movement of the head of the user is indicated by a solid line 2301, and the detected movement of the head recognized from an image taken with a camera is indicated by a dot-and-dash line 2302. As shown in the drawing, movement detection through image recognition can show the correct value only after a certain amount of time.

The movement of the head of the user can be detected by a sensor such as the gyro sensor (described above). In FIG. 23, the movement of the head detected by a sensor such as the gyro sensor is indicated by a dashed line 2303.

Therefore, as a process to be performed by the virtual object generating unit 102 or the virtual object control unit 101, image correction is performed to move the display area of the virtual object 150 so as to offset the movement of the head of the user detected by a sensor such as the gyro sensor.

However, the gyro sensor is a relativity sensor, and therefore, the movement of the head of the user per unit time can be detected, but the absolute coordinates are not clear. Therefore, there is a risk of gradual delay. To counter this problem, the result of the image recognition denoted by reference numeral 2302 is used to correct the delay, and a process to adjust the result to the correct value is performed in parallel. Specifically, a servo is conducted so that the difference between the movement of the head detected by the gyro sensor and the movement detected through image recognition becomes zero, and the difference is adjusted to zero (is made to converge on the absolute coordinates with reference to an image) at a certain time, or the difference is forced to become zero when the head stays still. A certain effect can also be achieved by performing differential control on the movement detected by the gyro sensor (motion prediction using differential control in a feed-forward manner, or differential signal superimposition).

In a case where the virtual object 150 reacts to action of the actual object 151, there is also the problem of latency. For example, in a case where the virtual object 150 performs reaction such as tilting its body forward, changing the positions of its feet, jumping, or rolling down when the actual object 151 on which the virtual object 150 stands is sloped (see FIG. 15), if the delay time until the virtual object 151 reacts to the movement of the actual object 151 is too long, the movement of the virtual object 150 does not look like reaction, and the image becomes unnatural. If the movement of the actual object 151 is detected through image recognition from an image of the actual object 151 captured with a camera, the correct value can be obtained only after a certain amount of time. In a case where the detecting unit 104 in the display apparatus 402 detects action of the actual object 151 from an image taken with a camera, and the control apparatus 401 generates action of the virtual object 150 in response to the action and displays the action on the display apparatus 402, there is of course the delay caused by the calculation processes in the respective apparatuses 401 and 402, and the communication process between the apparatuses 401 and 402.

Therefore, as a process to be performed by the virtual object generating unit 102 or the virtual object control unit 101, control is performed on the virtual object 150 acting in response to a change in the location or the posture of the actual object 151 detected by the gyro sensor (described above) included as the state detecting unit 415 in the output apparatus 403. For example, the virtual object 150 is made to perform reaction such as tilting its body forward, changing the positions of its feet, jumping, or rolling down.

Since the gyro sensor is a relativity sensor, the movement of the head of the user per unit time can be detected, but the absolute coordinates are not clear. Therefore, conformation to image information is performed (as described above).

CITATION LIST

Patent Document

Patent Document 1: JP 2010-49690 A
Patent Document 2: JP 2005-12385 A
Patent Document 3: JP 2005-165776 A
Patent Document 4: JP 2006-262980 A Patent Document 5: JP 2008-304268 A
Patent Document 6: JP 2012-248930 A
Patent Document 7: JP 2012-155655 A

INDUSTRIAL APPLICABILITY

The technology disclosed in this specification has been described in detail, with reference to specific embodiments. However, it is obvious that those skilled in the art can make modifications to and substitutions of the embodiments without departing from the scope of the technology disclosed in this specification.

The technology disclosed in this specification relates to a technology for presenting interaction between a virtual object and the real space, and FIGS. 2, 4, 5, and 29 show examples of system configurations to realize the technology in this embodiment. However, embodiments to realize the technology are not limited to the above.

Although head mount displays have been described as display apparatuses that present a virtual object to the user in this embodiment, the technology disclosed in this specification is not limited to them. Various information terminals having display screens, such as smartphones, tablet terminals, and game controllers, can be used as display apparatuses.

In this specification, FIGS. 12, 26, 27, and 28 show examples of actual objects on which a virtual object appears. However, the technology disclosed in this specification is not limited to them.

In short, the technology disclosed in this specification has been described through examples, and the descriptions in this specification should not be interpreted in a restrictive manner. The claims should be taken into account in understanding the subject matter of the technology disclosed in this specification.

The technology disclosed in this specification may also be embodied in the structures described below.

(1) An information processing apparatus including:
an output unit that applies action to an actual object; and
a control unit that controls output from the output unit in accordance with action performed on the actual object by a virtual object, or action to be performed on the virtual object by the actual object.

(2) The information processing apparatus of (1), further including
identification information for identifying the information processing apparatus.

(3) The information processing apparatus of (1), further including
a receiving unit that receives a result of detection of action to be performed on the actual object by the virtual object,
wherein the control unit controls output from the output unit in accordance with the received result of detection.

(4) The information processing apparatus of (1), further including
a virtual object control unit that controls action of the virtual object,
wherein the control unit controls output from the output unit in accordance with the action of the virtual object controlled by the virtual object control unit.

(5) The information processing apparatus of (4), wherein the virtual object control unit controls appearance and disappearance of the virtual object.

(6) The information processing apparatus of (1), wherein the output unit includes at least one of the output devices: a vibrating device, a pulse generating device, a heat generating device, a cooling device, an air blowing device, an acoustic device, a light emitting device, and a transfer device,
the at least one of the output devices being incorporated into the actual object.

(7) The information processing apparatus of (1), wherein the control unit controls output from the output unit in synchronization with action of the virtual object displayed on a display apparatus.

(8) An information processing method including:
the step of acquiring action performed on an actual object by a virtual object, or action to be performed on the virtual object by the actual object; and
the step of applying action to the actual object in accordance with the action performed on the actual object by the virtual object, or the action to be performed on the virtual object by the actual object.

(9) A display apparatus including:
a detecting unit that detects a specific actual object; and
a display unit that displays a virtual object in response to the detection of the specific actual object.

(10) The display apparatus of (9), wherein
the detecting unit identifies the actual object, and
the display unit displays the virtual object corresponding to the identified actual object.

(11) The display apparatus of (9), wherein the detecting unit identifies the actual object based on identification information accompanying the actual object, or identifies the actual object through object recognition.

(12) The display apparatus of (9), wherein
the detecting unit detects the actual object from a field of view of a user, and
the display unit displays the virtual object overlapped on the actual object.

(13) The display apparatus of (9), further including
a virtual object control unit that controls action of the virtual object.

(14) The display apparatus of (13), wherein the virtual object control unit controls appearance and disappearance of the virtual object.

(15) The display apparatus of (13), wherein the virtual object control unit controls appearance or disappearance of the virtual object in accordance with motion of a user.

(16) The display apparatus of (13), wherein the virtual object control unit controls the amount of information about the virtual object displayed on the display unit, in accordance with motion or a state of a user, or the time of the day.

(17) The display apparatus of (13), wherein the virtual object control unit controls action performed on the actual object by the virtual object.

(18) The display apparatus of (13), wherein the virtual object control unit controls action of the virtual object in accordance with action to be received by the virtual object from the actual object.

(19) The display apparatus of (13), wherein
the detecting unit detects action of the virtual object on the actual object, or action to be received by the virtual object from the actual object, and
the virtual object control unit controls action of the virtual object based on a result of the detection performed by the detecting unit.

(20) The display apparatus of (13), wherein the virtual object control unit controls action of the virtual object to be synchronized with action of the actual object.

(21) The display apparatus of (9), further including
a transmitting unit that transmits a result of detection performed by the detecting unit to an external apparatus.

(22) The display apparatus of (9), wherein the virtual object displayed on the display unit is constantly in motion.

(23) The display apparatus of (9), wherein, when used, the display unit is mounted on the head or a facial part of a user.

(24) The display apparatus of (23), further including a location/posture detecting unit that detects a location and a posture of the head or the facial part of the user, wherein the display unit corrects display of the virtual object in the opposite direction from a change in the location or the posture of the head or the facial part of the user.

(25) A display method including:
the detection step of detecting a specific actual object; and
the display step of displaying a virtual object in response to the detection of the specific actual object.

(26) An information processing system including:
a control apparatus that control action of a virtual object;
a display apparatus that detects an actual object and displays the virtual object corresponding to the actual object; and
an output apparatus that applies action to the actual object in accordance with action performed on the actual object by the virtual object, or action to be performed on the virtual object by the actual object.

(27) An information processing system including:
a display apparatus that detects an actual object and displays the virtual object corresponding to the actual object, and controls action of the virtual object; and
an output apparatus that applies action to the actual object in accordance with action performed on the actual object by the virtual object, or action to be performed on the virtual object by the actual object.

REFERENCE SIGNS LIST

101 Virtual object control unit
102 Virtual object generating unit
103 Display unit
104 Detecting unit
105 Output unit
105 Output control unit
107 Environment detecting unit
108 State detecting unit
150 Virtual object
151 Actual object
152 Identification information
201 Display apparatus
202 Output apparatus
213 Environment detecting unit
401 Control apparatus
402 Display apparatus
403 Output apparatus
413 Environment detecting unit
414 State detecting unit
415 State detecting unit
700 Image display apparatus (transmissive type)
701L, 701R Virtual image optical unit
702 Support
703L, 703R Microphone
704L, 704R Display panel
901 Control unit
901A ROM
901B RAM
902 Input operating unit
903 Remote control receiving unit
904 State information acquiring unit
905 Communication unit
906 Storage unit
907 Image processing unit
908 Display drive unit
909 Display unit
910 Virtual image optical unit
912 External camera
913 Audio processing unit
914 Audio input/output unit
915 External display unit
916 Environmental information acquiring unit
1001 Control unit
1001A ROM
1001B RAM
1002 Communication unit
1003 State detecting unit
1004 Environment detecting unit
1010 Drive control unit
1020 Actuator unit
1101 Vibrating device
1102 Heat generating device
1103 Cooling device
1104 Air blowing device
1105 Acoustic device
1106 Light emitting device
1107 Transfer device
1108 Pulse generating device

The invention claimed is:

1. An information processing apparatus, comprising:
an actual object comprising:
an identifier includes identification information associated with identification of the actual object;
an output unit configured to apply a first action to the actual object based on the identification of the actual object;
a control unit configured to control an output from the output unit based on one of a second action executed on the actual object by a virtual object, or a third action to be executed on the virtual object by the actual object; and
a virtual object control unit configured to change the second action executed on the actual object by the virtual object,
wherein the second action is changed based on at least one of environmental information that comprises information of a real space that surrounds the virtual object and a user, or state information that comprises the user's current state in the real space.

2. The information processing apparatus according to claim 1, further comprising
a receiving unit
configured to receive a result of detection of the second action executed on the actual object by the virtual object,
wherein the control unit is further configured to control the output from the output unit based on the received result of the detection of the second action.

3. The information processing apparatus according to claim 1, wherein the control unit is further configured to control the output from the output unit based on the second action executed on the actual object by the virtual object controlled by the virtual object control unit.

4. The information processing apparatus according to claim 1,
wherein the output unit includes at least one of a vibrating device, a pulse generating device, a heat generating device, a cooling device, an air blowing device, an acoustic device, a light emitting device, or a transfer device.

5. The information processing apparatus according to claim 1, wherein one of the second action executed on the actual object by the virtual object or the third action to be executed on the virtual object by the actual object is determined based on a user operation with respect to the virtual object.

6. An information processing method, comprising:
in an information processing apparatus that comprises an actual object that includes an output unit and an identifier having identification information associated with identification of the actual object:
acquiring one of a first action executed on the actual object by a virtual object or a second action executed on the virtual object by the actual object, based on the identification of the actual object;
applying, via the output unit, a third action to the actual object based on one of the first action executed on the actual object by the virtual object or the second action to be executed on the virtual object by the actual object; and
changing the first action executed on the actual object by the virtual object,
wherein the second action is changed based on at least one of environmental information that comprises information of a real space surrounding the virtual object and a user, or state information that comprises the user's current state in the real space.

7. A display apparatus, comprising:
a detecting unit configured to:
detect a specific actual object;
read identification information from an identifier included in the specific actual object, based on the detection of the specific actual object; and
identify the specific actual object based on the read identification information;
a display unit configured to display a virtual object based on the identification of the specific actual object;
an input operating unit configured to determine a first action of the virtual object on the specific actual object;
a virtual object control unit configured to change the first action of the virtual object on the specific actual object based on at least one of environmental information comprising information of a real space surrounding the virtual object and a user, or state information comprising the user's current state in the real space; and
a location/posture detecting unit configured to detect a location and a posture of one of the user's head or the user's facial part,
wherein the display unit is further configured to change a display position of the displayed virtual object based on the detected location and the detected posture of the one of the user's head or the user's facial part.

8. The display apparatus according to claim 7, wherein the detecting unit is further configured to detect the specific actual object based on the user's field of view, and
the display unit is further configured to display the virtual object overlapped on the specific actual object.

9. The display apparatus according to claim 7, wherein the virtual object control unit is further configured to control one of appearance or disappearance of the virtual object based on the user's motion.

10. The display apparatus according to claim 7,
wherein the virtual object control unit is further configured to control information about the virtual object displayed on the display unit, and
wherein the information is controlled based on one of the user's motion,
the user's current state, or a time of day.

11. The display apparatus according to claim 7, wherein the virtual object control unit is further configured to control the first action of the virtual object on the specific actual object, based on a second action received by the virtual object from the specific actual object.

12. The display apparatus according to claim 7, wherein
the detecting unit is further configured to detect at least one of the first action of the virtual object on the specific actual object or a second action received by the virtual object from the specific actual object, and
the virtual object control unit is further configured to control the first action of the virtual object on the specific actual object based on a result of the detection of the at least one of the first action of the virtual object on the specific actual object or the second action received by the virtual object from the specific actual object.

13. The display apparatus according to claim 7, wherein the virtual object control unit is further configured to control the first action of the virtual object on the specific actual object such that the first action of the virtual object on the specific actual object is synchronized with a second action of the specific actual object on the virtual object.

14. The display apparatus according to claim 7,
wherein the display unit is on one of the user's head or the user's facial part.

15. A display method, comprising:
detecting a specific actual object;
reading identification information from an identifier included in the specific actual object;
identifying the specific actual object based on the identification information;
displaying a virtual object based on the identification of the specific actual object;
changing an action executed on the specific actual object by the virtual object based on at least one of environmental information that comprises information of a real space surrounding the virtual object and a user, or state information that comprises the user's current state in the real space;
detecting a location and a posture of one of the user's head or the user's facial part; and
changing a display position of the virtual object based on the detected location and the detected posture of the one of the user's head or the user's facial part.

16. An information processing system, comprising:
a display apparatus configured to:
detect an actual object;
read identification information from an identifier included in the actual object based on the detection of the actual object;
identify the actual object based on the read identification information;
display a virtual object corresponding to the actual object based on the identification of the actual object;
detect a location and a posture of one of a user's head or the user's facial part; and
change a display position of the virtual object based on the detected location and the detected posture of the one of the user's head or the user's facial;
a control apparatus configured to control a first action of the virtual object on the actual object; and
an output apparatus configured to apply a second action to the actual object based on one of the first action executed of the virtual object on the actual object or a third action to be executed on the virtual object by the actual object, wherein the display apparatus is further configured to change the first action of the virtual object on the actual object based on at least one of environmental information comprising information of a real space that surrounds the virtual object and the user, or state information comprising the user's current state in the real space.

17. An information processing system, comprising:

a display apparatus configured to:
    detect an actual object;
    read identification information from an identifier included in the actual object based on the detection of the actual object;
    identify the actual object based on the read identification information;
    display a virtual object corresponding to the actual object based on the identification of the actual object;
    control a first action of the virtual object on the actual object based on at least one of environmental information comprising information of a real space that surrounds the virtual object and a user, or state information comprising the user's current state in the real space;
    detect a location and a posture of one of the user's head or the user's facial part; and
    change a display position of the virtual object based on the detected location and the detected posture of the one of the user's head or the user's facial part; and
an output apparatus configured to apply a second action to the actual object based on one of the first action executed on the actual object by the virtual object, or a third action to be executed on the virtual object by the actual object.

* * * * *